United States Patent [19]

Shirakawa

[11] Patent Number: 5,706,780
[45] Date of Patent: Jan. 13, 1998

[54] DIESEL ENGINE FUEL PROPERTY DETERMINING DEVICE AND CONTROLLER

[75] Inventor: Takashi Shirakawa, Yokosuka, Japan

[73] Assignee: Nissan Motor Co., Ltd., Kanagawa, Japan

[21] Appl. No.: 740,518

[22] Filed: Oct. 30, 1996

[30] Foreign Application Priority Data

Oct. 31, 1995 [JP] Japan ................................ 7-283601

[51] Int. Cl.$^6$ ........................... F02M 37/04; F02D 7/00
[52] U.S. Cl. ........................... 123/381; 123/446; 123/501
[58] Field of Search ........................... 123/500, 501, 123/502, 446, 381, 494

[56] References Cited

U.S. PATENT DOCUMENTS

| 4,493,302 | 1/1985 | Kawamura | 123/502 |
|---|---|---|---|
| 4,766,864 | 8/1988 | Ban et al. | 123/381 |
| 4,869,218 | 9/1989 | Fehlmann et al. | 123/381 |
| 5,357,912 | 10/1994 | Barnes et al. | 123/381 |
| 5,423,302 | 6/1995 | Glassey | 123/381 |
| 5,445,129 | 8/1995 | Barnes | 123/381 |
| 5,617,831 | 4/1997 | Shirakawa | 123/502 |

*Primary Examiner*—Thomas N. Moulis
*Attorney, Agent, or Firm*—Lowe, Price, LeBlanc & Becker

[57] ABSTRACT

In a diesel engine comprising a fuel injection pump which supplies pressurized fuel by a plunger to a fuel injection nozzle, fuel properties such as fuel viscosity are determined. A fuel supply start timing by the plunger and fuel injection start timing by the fuel injection nozzle are respectively detected, a difference between them is computed as an injection retardation period, and the fuel viscosity is determined based on the injection retardation period. A fuel injection amount, injection timing or exhaust recirculation amount are corrected based on the determined fuel viscosity, therefore errors in their control do not arise due to differences of fuel viscosity.

12 Claims, 24 Drawing Sheets

| | ELECTROMAGNETIC VALVE | | DUTY CONTROL VALVE | | INTAKE THROTTLE | EGR VALVE | EGR AMOUNT |
|---|---|---|---|---|---|---|---|
| | VALVE 42 | VALVE 44 | NEGATIVE PRESSURE PASSAGE | POSITIVE PRESSURE PASSAGE | | | |
| REGION I | ON (OPEN) | ON (OPEN) | ON (OPEN) | ON (OPEN) | CLOSE | OPEN | LARGE |
| REGION II | OFF (CLOSE) | ON (OPEN) | ON (OPEN) | ON (OPEN) | HALF-OPEN | OPEN | ↕ |
| REGION III | OFF (CLOSE) | OFF (CLOSE) | ON (OPEN) | ON (OPEN) | OPEN | OPEN | |
| REGION IV | OFF (CLOSE) | OFF (CLOSE) | ON (OPEN) | OFF (CLOSE) | OPEN | HALF-OPEN | SMALL |
| EGR IS CUT | OFF (CLOSE) | OFF (CLOSE) | OFF (CLOSE) | OFF (CLOSE) | OPEN | CLOSE | NONE |

FIG. 18

DIESEL ENGINE FUEL PROPERTY DETERMINING DEVICE AND CONTROLLER

FIELD OF THE INVENTION

This invention relates to determination of the properties of fuel used in a diesel engine, and to various controls depending on fuel properties.

BACKGROUND OF THE INVENTION

Distribution type fuel injection pumps in diesel engines generally adjust a fuel injection amount using a control sleeve and adjust an injection timing using a timing control valve.

In such a fuel injection pump, when fuels of different viscosity are used, the fuel injection amount will not be the same even when the position of the control sleeve is the same.

For example, when a light fuel having a lower viscosity than a standard fuel is used, the pump efficiency declines due to an increase of a leak amount in the pump, and a leak amount through a compression stroke of a plunger also increases. Hence the fuel injection amount decreases and the pump output declines even when the control sleeve position is the same.

Therefore, when light fuel is used in a pump of which the pump characteristics are determined based on the properties of standard fuel, it may occur that the engine stops during idle rotation, or the accelerator response 1s impaired due to the fact that the actual fuel injection amount is less than a desired injection amount for steady state running conditions of the engine. Conversely, when a heavy fuel of higher viscosity than standard fuel is used, the pumping efficiency inside the pump increases and the leak amount through the pressurizing stroke of the plunger decreases, the fuel injection amount for the same control sleeve position increases. In this case, the fuel injection amount during idle rotation control may be excessive so that idle rotation becomes unstable, or the actual fuel injection amount is greater than the desired fuel injection amount under steady state running conditions so that the accelerator response is too sensitive.

The precision of fuel injection amount is largely affected also by control of the fuel injection timing or an exhaust gas recirculation (EGR) amount. These control target values are set according to an engine speed and load, and In this case, the load is often represented by the fuel injection amount, and used as a control parameter to calculate the fuel injection timing or EGR amount.

In such a case, any discrepancy of the fuel injection amount affects the control of fuel injection timing or EGR amount. When light fuel is used in a pump in which the injection amount is determined based on standard fuel properties, a target injection amount is estimated larger than the actual injection amount. As a result, the load is determined larger than it really is, and a shift of the EGR amount occurs towards reduction. Further, when control sleeve or delivery valve losses (leaks) increase due to the use of light fuel, the fuel injection timing is retarded. This retardation leads to a worsening of exhaust gas emissions.

Conversely, when heavy fuel is used, the target injection amount is estimated less than the actual fuel amount. As a result, the load is determined too low, the EGR amount increases, and the injection timing is advanced relative to the desired timing. This also leads to a worsening of exhaust gas emissions.

The effect of differences of fuel viscosity has been described in the case of a distribution type fuel injection pump, but this effect is not specific to distribution type pumps, and also occurs in a series pump, cam shaftless fuel injection pumps and unit injectors. These three types of fuel injection pump, including unit injectors, are generally referred to as jerk-pumps.

SUMMARY OF THE INVENTION

It is therefore an object of this invention to detect fuel properties by a simple method with high precision in a diesel engine fitted with a jerk-type fuel injection pump.

It is a further object of this invention to prevent the occurrence of undesirable phenomena regarding fuel injection amount, injection timing and EGR control in a diesel engine due to the different fuel properties.

In order to achieve the above objects, this invention provides a fuel viscosity detector for such a diesel engine that comprises a fuel injection pump for supplying fuel under pressure by means of a plunger and a fuel injection nozzle for injecting the fuel into a cylinder of the engine. The detector comprises a mechanism for detecting a fuel supply start timing of the plunger, a mechanism for detecting a fuel injection start timing of the fuel injection nozzle, a mechanism for calculating a difference between the fuel supply start timing and the fuel injection start timing as an injection retardation period, and a mechanism for determining a fuel viscosity based on the injection retardation period.

This invention also provides a controller for such a diesel engine that comprises a fuel injection pump for supplying fuel under pressure by means of a plunger and a fuel injection nozzle for injecting the fuel into a cylinder of the engine. The controller comprises an actuator for varying a fuel supply start timing of the plunger according to a fuel supply start signal, a mechanism for detecting a fuel supply start timing of the plunger, a mechanism for detecting fuel injection start timing of the fuel injection nozzle, a mechanism for calculating a difference between the fuel supply start timing and the fuel injection start timing as an injection retardation period, a mechanism for computing a fluctuation amount of the injection retardation period, and a mechanism for advance correcting the fuel supply start signal based on the fluctuation amount.

This invention also provides a controller for such a diesel engine that comprises a fuel injection pump for supplying fuel under pressure by means of a plunger, a fuel injection nozzle for injecting the fuel into a cylinder of the engine, and an accelerator for varying a fuel supply amount supplied by the plunger. The controller comprises the aforesaid fuel viscosity detector, an actuator for varying a pressurized fuel amount by the plunger according to a fuel supply amount signal, a mechanism for determining a target fuel supply amount according to an operation of the accelerator, a mechanism for specifying a correspondence relation between the fuel supply amount signal and a supply amount of fuel of standard viscosity, a mechanism for correcting the fuel supply amount signal obtained from the target fuel supply amount and the correspondence relation based on a difference between a fuel viscosity detected by the fuel viscosity detector and the standard viscosity, and a mechanism for inputting a corrected fuel supply amount signal to the actuator.

According to another aspect of this invention, the controller comprises the aforesaid fuel viscosity detector, an actuator for varying a pressurized fuel amount by the plunger according to a fuel supply amount signal, a mechanism for determining a target fuel supply amount according to an operation of the accelerator, a mechanism for specifying a correspondence relation between the fuel supply amount signal and a supply amount of fuel of a standard viscosity, a mechanism for correcting the correspondence relation based on a difference between a fuel viscosity detected by the fuel viscosity detector and the standard viscosity, a mechanism for calculating the fuel supply amount signal based on the target fuel supply amount and a corrected correspondence relation corrected by the correcting mechanism, and a mechanism for inputting the fuel supply amount signal to the actuator.

According to yet another aspect of this invention, the controller comprises the aforesaid fuel viscosity detector, an actuator for varying a pressurized fuel amount by the plunger according to a fuel supply amount signal, a mechanism for determining a target fuel supply amount according to an operation of the accelerator, a mechanism for specifying a correspondence relation between the fuel supply amount signal and a supply amount of fuel of a standard viscosity, a mechanism for specifying a correspondence relation between the fuel supply amount signal and a supply amount of fuel of a non-standard viscosity, a mechanism for selecting a correspondence relation from the correspondence relations based on a difference between a fuel viscosity detected by the fuel viscosity detector and the standard viscosity, and a mechanism for inputting a supply amount signal obtained from the target fuel supply amount and the selected correspondence relation to the actuator.

According to yet another aspect of this invention, the controller comprises the aforesaid fuel viscosity detector, an actuator for varying a fuel supply start timing of the plunger according to a fuel supply start signal, a mechanism for determining a target fuel supply amount according to an operation of the accelerator, a mechanism for correcting the target fuel supply amount based on a fuel viscosity detected by the fuel viscosity detector, a mechanism for detecting a rotation speed of the engine, and a mechanism for computing a target fuel supply start timing based on the corrected target fuel supply amount and the rotation speed, and a mechanism for inputting a fuel supply start signal corresponding to the target fuel supply timing to the actuator.

According to yet another aspect of this invention, the controller comprises the aforesaid fuel viscosity detector, an actuator for varying a fuel supply start timing of the plunger according to a fuel supply start signal, a mechanism for detecting a fuel supply period by the plunger, a mechanism for correcting a fuel supply amount estimated from the fuel supply period based on a fuel viscosity detected by the fuel viscosity detector, a mechanism for detecting a rotation speed of the engine, a mechanism for computing a target fuel supply start timing based on the corrected fuel supply amount and the rotation speed, and a mechanism for inputting a fuel supply start signal corresponding to the target fuel supply start timing to the actuator.

According to yet another aspect of this invention, the controller comprises the aforesaid fuel viscosity detector, a mechanism for setting a proportional constant according to a detected fuel viscosity, a mechanism for detecting an engine idle rotation speed, a mechanism for computing a proportional part of a fuel supply amount correction based on a difference between an idle rotation speed and a predetermined target idle rotation speed, and the proportional constant, a mechanism for computing a correction amount of a fuel supply amount when the engine is in an idle running state using the proportional part, and a mechanism for varying the fuel supply amount supplied by the plunger when the engine is in the idle running state according to the correction mount.

This invention also provides a controller for such a diesel engine that comprises a fuel injection pump for supplying fuel under pressure by means of a plunger, a fuel injection nozzle for injecting the fuel into a cylinder of the engine, an accelerator for varying a fuel supply amount supplied by the plunger, and an EGR valve for recirculating a part of exhaust of the engine. The controller comprises the aforesaid fuel viscosity detector, an actuator for varying a flowrate of the EGR valve according to a flowrate signal, a mechanism for determining a target fuel supply amount according to an operation of the accelerator, a mechanism for correcting the target fuel supply amount based on a fuel viscosity detected by the fuel viscosity detector, a mechanism for detecting a rotation speed of the engine, a mechanism for computing a target flowrate of the EGR valve based on the corrected target fuel supply amount and the rotation speed, and a mechanism for inputting a flowrate signal corresponding to the target flowrate to the actuator.

According to an aspect of this invention, the controller comprises the aforesaid fuel viscosity detector, an actuator for varying a flowrate of the EGR valve according to a flowrate signal, a mechanism for detecting a fuel supply period by the plunger, a mechanism for correcting a fuel supply amount estimated from the fuel supply period, based on a fuel viscosity detected by the fuel viscosity detector, a mechanism for detecting a rotation speed of the engine, a mechanism for computing a target flowrate of the EGR valve based on the corrected target fuel supply amount and the rotation speed, and a mechanism for inputting a flowrate signal corresponding to the target flowrate to the actuator.

According to yet another aspect of this invention, the controller comprises the aforesaid fuel viscosity detector, an actuator for varying a flowrate of the EGR valve according to a flowrate signal, a mechanism for determining a target fuel supply amount according to an operation of the accelerator, a mechanism for correcting the target fuel amount based on a fuel viscosity detected by the fuel viscosity detector, a mechanism for detecting a rotation of the engine, a mechanism for detecting an intake air volume of the engine, a mechanism for detecting a temperature of the intake air, a mechanism for computing an air-fuel ratio inside the cylinder from the intake air volume, the intake air temperature and the corrected target fuel supply amount, a mechanism for computing a target flowrate of the EGR valve based on the corrected target fuel supply amount, the rotation speed and the air-fuel ratio, and a mechanism for inputting a flowrate signal corresponding to the target flowrate to the actuator.

According to yet another aspect of this invention, the controller comprises the aforesaid fuel viscosity detector, an actuator for varying a flowrate of the EGR valve according to a flowrate signal, a mechanism for detecting a fuel supply period by the plunger, a mechanism for correcting the target fuel supply amount based on a fuel viscosity detected by the fuel viscosity detector, a mechanism for detecting a rotation speed of the engine, a mechanism for detecting an intake air volume of the engine, a mechanism for detecting a temperature of the intake air, a mechanism for computing an air-fuel ratio inside the cylinder from the intake air volume, the intake air temperature and the corrected target fuel supply amount, a mechanism for computing a target flowrate of the EGR valve based on the corrected target fuel supply amount, the engine speed and the air-fuel ratio, and a mechanism for inputting a flowrate signal corresponding to the target flowrate to the actuator.

The details as well as other features and advantages of this invention are set forth in the remainder of the specification and are shown in the accompanying drawings.

BRIEF DESCRIPTION OF THE DRAWINGS

FIG. 18 is a table describing control of the aforesaid control regions by the EGR controller of FIG. 16.

DESCRIPTION OF THE PREFERRED EMBODIMENTS

Figure 1:
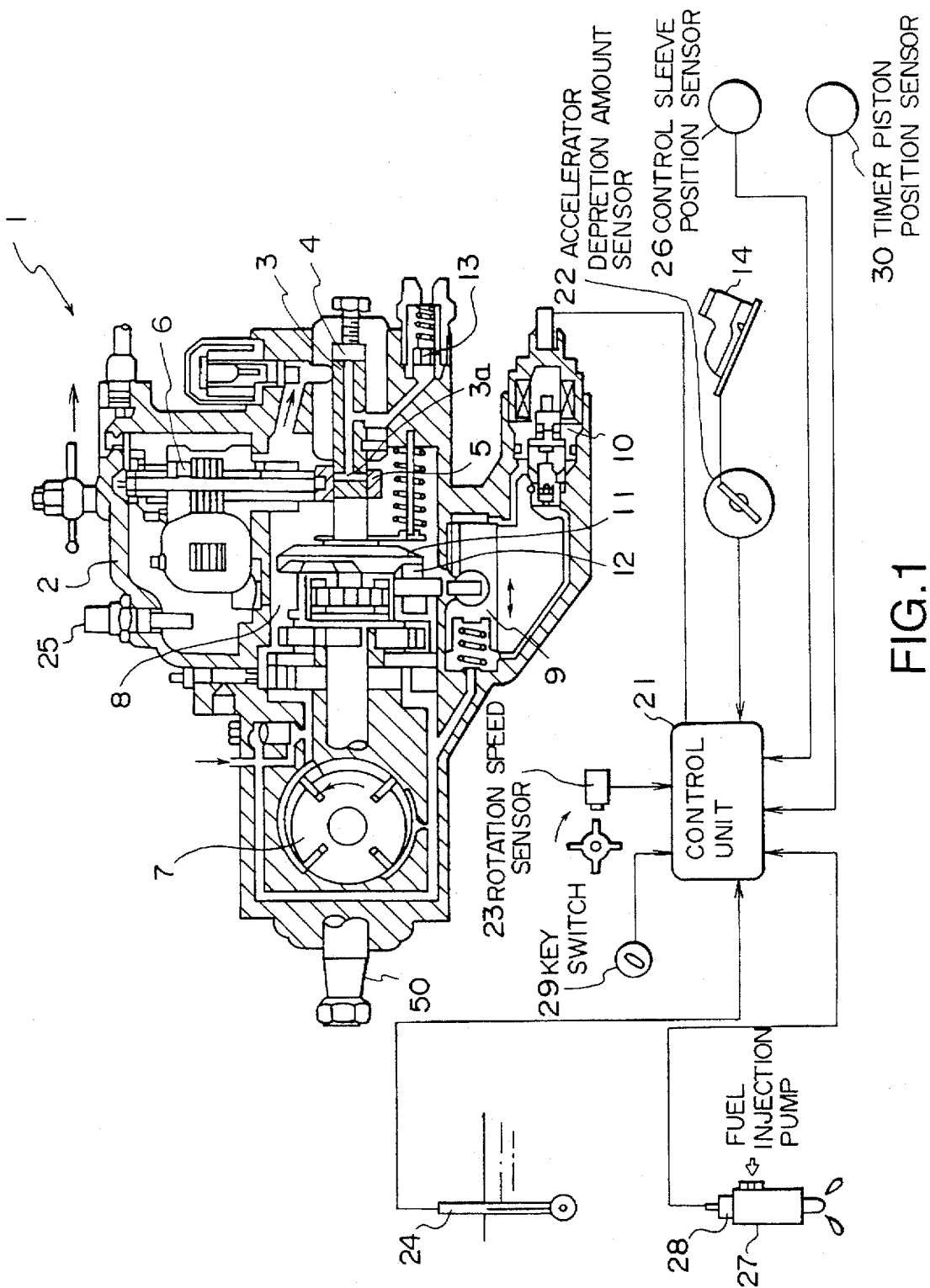
FIG. 1 is a schematic diagram of a distribution type fuel injection pump and its controller according to a first embodiment of this invention.

Referring to FIG. 1 of the drawings, a distribution type fuel injection pump comprises a plunger 3 which compresses fuel inside a pressure chamber 4 while rotating and performing a piston motion inside an injection pump body 2 forming a pump housing. A cam disk 11 fixed to a base of the plunger 3 causes the plunger 3 to perform a piston motion in an axial direction when it climbs over a cam roller 12 as it rotates with the plunger 3. When the plunger 3 moves towards the right of the figure fuel in the pressure chamber 4 is pressurized, and is supplied to a fuel injection nozzle 27 inside an automobile diesel engine, not shown, via a delivery valve 13.

A control sleeve 5 fits over the outer circumference of the plunger 3 such that it is free to slide. The control sleeve 5 is driven by a rotary solenoid 6, and an amount of fuel injected by the fuel injection nozzle 27 is adjusted by opening and closing a cutoff port 3a formed in the plunger 3. In other words, as an input voltage to the rotary solenoid 6 increases, the control sleeve 5 Is displaced towards the right of the figure, and a fuel injection end timing is retarded. This causes a fuel injection amount to increase. Conversely, when the input voltage to the rotary solenoid 6 is decreased, the control sleeve 5 moves to the left of the figure so that the fuel injection end timing is advanced, and the fuel Injection amount decreases.

The fuel injection pump 1 is supplied with fuel by a feed pump 7 driven by a pump drive axis 50 common with the fuel injection pump 1. Fuel supplied from the feed pump 7 lubricates the inside of the injection pump body 2, is stored at a predetermined low pressure in a pump chamber 8, and is aspirated into the pressure chamber 4. The pump drive axis 50 is rotation driven by a crankshaft of the diesel engine. A fuel injection start timing is varied when a timer piston 9 changes a phase of the cam roller 12. The timer piston 9 is displaced according to an oil pressure acting on both of its ends, this oil pressure being controlled by a timing control valve 10. The fuel injection start timing is therefore advanced or retarded due to control by the timing control valve 10.

It should be noted that the feed pump 7 and timer piston 9 in FIG. 1 are shown with a 90° rotation for the sake of clarity.

The fuel injection amount and injection timing of the fuel injection pump 1 are controlled by a control unit 21. This control is performed according to signals from an accelerator depression amount sensor 22 which detects a depression amount of an accelerator 14 of the diesel engine, a rotation speed sensor 23 which detects a rotation speed of the fuel injection pump 1, a water temperature sensor 24 which detects a cooling water temperature of the diesel engine, a fuel temperature sensor 25 which detects a fuel temperature in the fuel injection pump 1, a control sleeve position sensor 26 which detects a position of the control sleeve 5 from the voltage input to the rotary solenoid 6, a nozzle lift sensor 28 which measures the injection timing of the fuel injection nozzle 27, a key switch 29 which identifies an engine start command, and a timer piston position sensor 30 which detects the position of the timer piston 9, corresponding signals being input to the control unit 21.

The control unit 21 vanes the position of the control sleeve 5 according to a voltage signal output to the rotary solenoid 6, and thereby controls the fuel injection amount of the fuel injection pump 1. The control unit 21 controls the fuel injection timing according to a duty signal output to the timing control valve 10.

In controlling the fuel injection amount, when the position of the control sleeve 5 is controlled based on the relation between the fuel injection amount and control sleeve position using standard fuel, i.e., fuel of a standard viscosity, a real fuel injection amount is shifted from a target fuel amount for the same control sleeve position when a fuel of different viscosity from that of the standard fuel is used.

Therefore, to achieve the target injection amount regardless of the fuel viscosity, the position of the control sleeve 5 must be varied according to the fuel viscosity.

For this purpose, the control unit 21 detects the fuel viscosity from a time difference between a fuel pressurized feed start timing of the plunger 3 and an opening timing of the injection nozzle 27, and corrects the voltage outage to the rotary solenoid 6 according to the fuel viscosity.

Even when the plunger 3 starts pressurized feed, a predetermined time is required for the injection nozzle 27 to reach the opening pressure In the following discussion therefore, the pressurized feed start timing of the plunger will be referred to as a static injection timing, and the opening timing of the injection nozzle will be referred to as a dynamic injection timing.

The static injection timing is defined, for example, by the following equation:

Static injection timing (°CA BTDC)=Timer piston position (mm)×
2.44(°CA/mm)+pump set angle (°CA BTDC)

Herein, the timer piston position at the minimum advance angle is 0 mm. The unit °CA signifies an angle corresponding to a crank angle, and BTDC signifies the crank angle before top dead center of an engine piston in each engine cylinder. The dynamic injection timing is detected by an output signal from the nozzle lift sensor 28 with reference to the output signal of a TDC sensor which detects each top dead center of the engine pistons The units of the dynamic injection timing are also expressed as (°CA BTDC). Herein, the difference between the static injection timing and dynamic injection timing is specified as ΔIT (°CA).

When the fuel viscosity is constant, ΔIT is determined by the injection system characteristics, i.e. the opening pressure of the injection nozzle 27, the diameter of the plunger 3, the cam characteristics of the cam disk 11, and the flowrate characteristics of the delivery valve 13.

Figure 2:
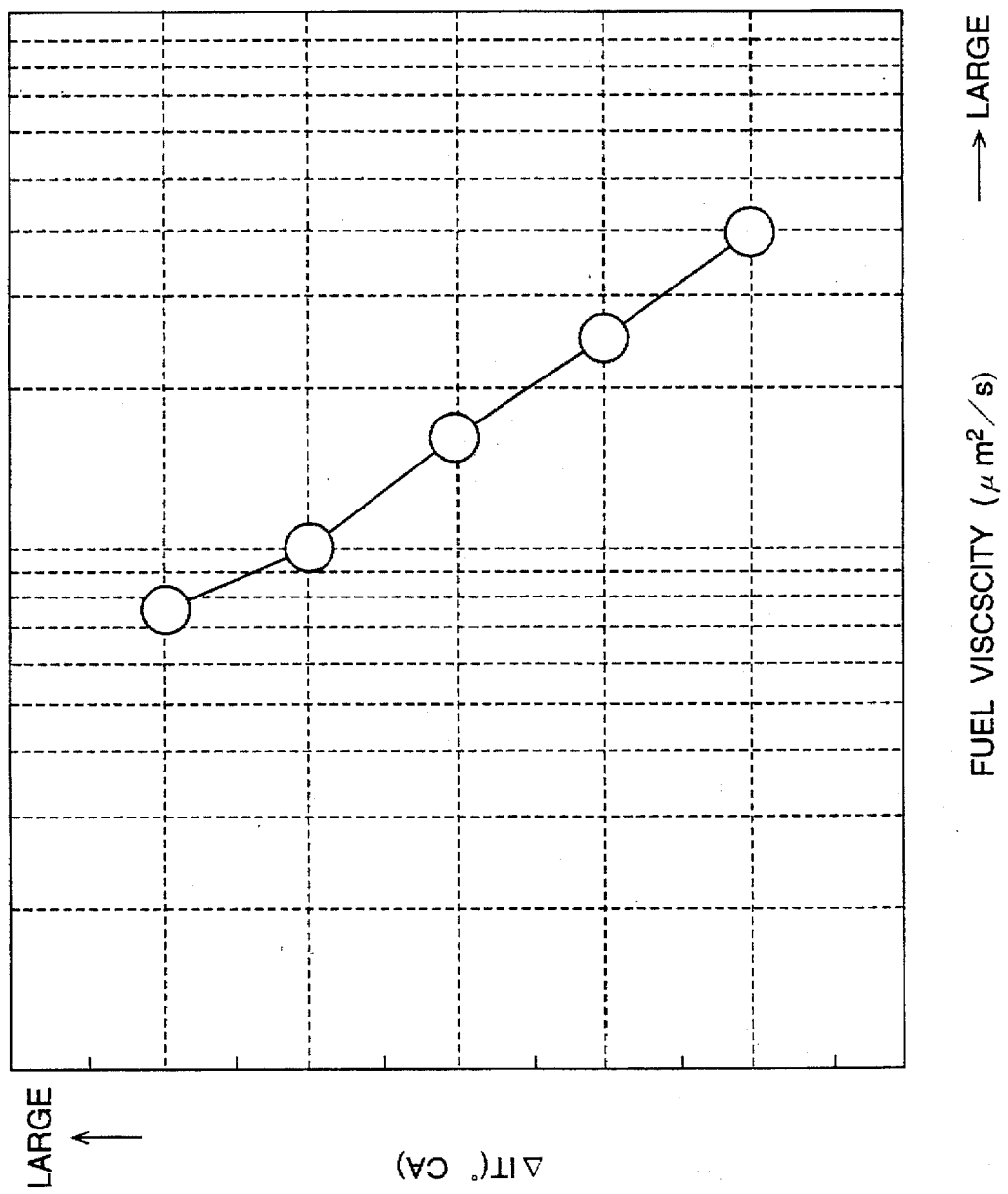
FIG. 2 is a diagram showing a relation between an injection retardation period and fuel viscosity during idle running of an engine according to the first embodiment of this invention.

The inventor obtained the experimental data shown in FIG. 2 regarding the relation between the injection retardation period ΔIT and the fuel viscosity (more precisely, the kinetic viscosity). This diagram shows characteristics at a constant idle rotation speed of the engine. The fuel viscosity on the horizontal axis is a logarithmic scale.

According to this diagram, there is a strong correlation between ΔIT and fuel viscosity, and the ratio of the fuel viscosity to ΔIT, i.e. the gain, is large. Using this characteristic, therefore, the fuel viscosity may be detected with high precision.

A pump set angle, and the injection nozzle opening pressure are both numerically controlled in the factory, and in general for the same fuel, the scatter of injection timing at constant fuel temperature is controlled so as not to exceed ±0.5°CA. The characteristics shown in FIG. 2 are therefore stable characteristics with little scatter.

In FIG. 2, the reason why ΔIT increases as the fuel viscosity becomes lighter is probably that, in the case of right fuel, the leak amount increases in the compression stroke of the plunger 3, and some time is required for the pressure to rise in a pressure line between the pump 1 and nozzle 27 due to the increase of a return amount in the delivery valve 13 when the injection is finished. In the case of heavy fuel, on the other hand, ΔIT decreases.

When fuel viscosity is estimated based on the injection retardation period ΔIT, the fuel viscosity may be detected without being affected by any temporal deterioration of the timing control valve 10 or injection nozzle 27. For example, the dynamic injection timing may be advanced due to squatting of a spring in the fuel injection nozzle 27 . The dynamic injection timing may also vary due to deterioration of the timing control valve 10. However, when the dynamic injection timing is feedback controlled based, for example, on the output signal from the nozzle lift sensor 28, the dynamic injection timing does not vary. When the injection pump 1 or the engine which rotation drives the injection pump 1 deteriorates, the static injection timing is retarded, but as the retardation is only of the order of 0.4° CA even in an endurance running test of 100,000 km, this does not present a problem. In other words, ΔIT is not easily affected by temporal deterioration of the timing control valve 10 or injection pump 1.

If the fuel viscosity can be detected with high precision from the injection retardation period ΔIT from the experimental data shown in FIG. 2, the same amount of fuel can be injected as in the case of standard fuel without being affected by fuel viscosity, by correcting the control sleeve position corresponding to the fuel injection amount according to the detected fuel viscosity.

In this case too, the target injection amount or the fuel injection amount detected by the control sleeve position sensor 26 represents a precise load unaffected by fuel viscosity, so the fuel injection timing control and EGR control which use the target injection amount as a load signal can also be performed without being affected by the fuel viscosity.

The aforesaid control performed by the control unit 21 will now be described using the diagram of FIG. 3. The various functions in the figure are all functions of the control unit 21.

Figure 3:
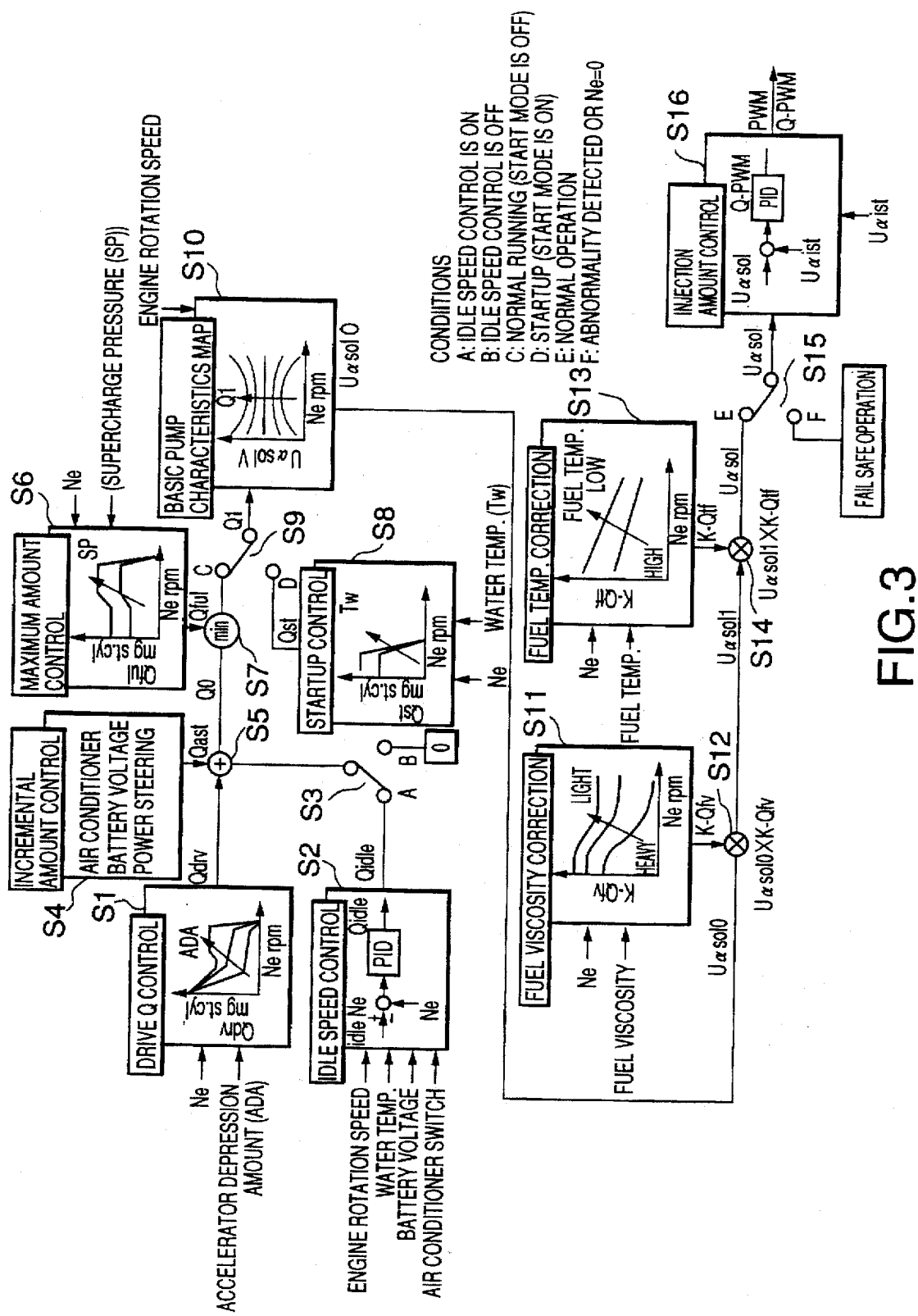
FIG. 3 is a block diagram describing a fuel injection amount control function of the controller.

In FIG. 3, in a function 51, a fuel injection amount characteristic map (drive Q map) is looked up from the diesel engine rotation speed Ne which is obtained from the output of the TDC sensor and the accelerator depression amount so as to calculate a basic fuel injection amount Qdrv. In a function S2, a fuel injection amount correction value Qidle is found by PID control from the target engine rotation speed and measured engine rotation speed so that the target engine rotation speed is reached when the engine is running idle. The rotation speed of a four stroke cycle diesel engine is twice the pump rotation speed.

In a function S3, it is determined whether or not idle rotation speed control conditions exist, and switching is performed.

Idle rotation speed control conditions are when, for example, the accelerator depression amount and engine rotation speed Ne are respectively within predetermined limits. When all these conditions are satisfied, the function S3 switches to a section A, and when any of these conditions is not satisfied, it switches to a section B. The section A is a section which adds the fuel injection amount correction Qidle found in the function S2 to the basic fuel injection amount Qdrv found in the function S1 and an accessory increment Qast of a function S4 described hereafter. The section B is a section which adds Qidle=0 to the basic fuel injection amount Qdrv and accessory increment Qast.

In the function S4, a fuel injection amount increment corresponding to an increase of engine load due to accessories such as an air conditioner, battery voltage and power steering, is computed. Fuel injection amount increments are previously determined for accessories, and a total fuel injection amount increment, i.e. the accessory increment Qast, is computed based on an air conditioner switch, battery voltage monitor value and an ON, OFF signal of a power steering switch.

In a function S5, a target injection amount Q0 obtained by adding the accessory increment Qast and the output of the aforesaid section A or section B to the basic fuel injection amount Qdrv, is calculated.

In a function S6, a maximum injection amount Qful for preventing smoke, etc., is looked up from a maximum injection amount map set according to the engine rotation speed and, in the case of an engine fitted with a supercharger, to a supercharge pressure. In a function S7, the smaller of the maximum injection amount Qful and target injection amount Q0 is set as the target injection amount during normal running conditions.

In a function S8, a fuel injection amount Qst during startup is looked up from the cooling water temperature and engine rotation speed. Next, in a function S9, it is determined whether or not the engine is starting up. This is done by, for example, determining whether or not a key switch is in a START position and the engine rotation speed is within a predetermined limit. During startup, Qst is set to a target injection amount Q1 in a section D, and at all other times, Q0 is set to the target injection amount Q1 in a section C.

In a function S10, a basic pump characteristic map is looked up, based on standard fuel, from the target injection amount Q1 and engine rotation speed Ne, and a target rotary solenoid output voltage U$\alpha$sol0 is calculated. This target rotary solenoid output voltage U$\alpha$sol0 corresponds to a target control sleeve position.

In a function S11, a fuel viscosity correction coefficient map is looked up from the fuel viscosity and engine rotation speed Ne, and a fuel viscosity correct/on coefficient K-Qfv is looked up. This correction coefficient K-Qfv is multiplied by the target rotary solenoid output voltage U$\alpha$sol0 in a function S12, and the value after multiplication is set as a new target rotary solenoid output voltage U$\alpha$sol1 (=U$\alpha$sol0×K-Qfv).

The value of the fuel viscosity correction coefficient K-Qfv is a value greater than 1 when light fuel is used. When light fuel is used, the fuel injection amount is less than the fuel injection amount corresponding to the control sleeve position when standard fuel is used. To compensate for the decrease, the rotary solenoid output voltage is corrected to the high voltage side, and the control sleeve is shifted from the standard fuel position towards the fuel increase side. Likewise, when heavy fuel is used, the rotary solenoid output voltage is corrected to the low voltage side, and the control sleeve position is shifted towards the fuel decrease side. For this purpose, the value of K-Qfv is set less than 1 when heavy fuel is used.

The reason why the fuel viscosity correction coefficient K-Qfv is varied according to the engine rotation speed is that the injection amount for a given control sleeve position depends not only on the fuel viscosity but also on the engine rotation speed.

In a function S13, a fuel temperature correction coefficient map is looked up from a fuel temperature detected by the fuel temperature sensor 25 and the engine speed Ne, and a fuel temperature correction coefficient K-Qtf is calculated. In a function S14, it is multiplied by the target rotary solenoid output voltage U$\alpha$sol1, and the value after multiplication is set to a new target rotary solenoid output voltage U$\alpha$sol1=U$\alpha$sol1×K-Qtf.

The correction according to fuel temperature assumes that the basic pump characteristics include a constant fuel temperature, and as the fuel injection amount will be different at a fuel temperature which is different from this temperature, the fuel injection amount is corrected so that it is unaffected by the fuel temperature and constant.

In S15, it is determined whether or not there is an abnormality in the fuel injection pump or engine. When there Is no abnormality, the routine switches to a section E which performs fuel amount control based on the target rotary solenoid output voltage U$\alpha$sol. When there is an abnormality, the routine switches to a section F which performs a failsafe operation such as, for example, closing of a fuel cut valve.

In S16, a PWM (Pulse Width Modulation) signal is output to the rotary solenoid 6 by PID (Proportional, Integral and Differential) control, based on a target rotary solenoid output voltage $\alpha$sol and a measured rotary solenoid output voltage U$\alpha$ist detected by the control sleeve position sensor 26.

The function S11, which is a characteristic feature of this invention, will now be described in more detail with reference to the flowchart of FIG. 4.

First, in a step S41, the engine speed Ne and fuel injection amount Qf(=target injection amount Q1), a measured injection timing ITi obtained from the outputs of the rotation speed sensor 23 and nozzle lift sensor 28, and an accelerator depression amount CL, are read.

In steps S42 and S43, the following conditions are checked in turn.

(1) The vehicle is running under quasi-steady state conditions (2) Fuel viscosity determining conditions are satisfied When both these conditions are satisfied, the routine proceeds to a step S44 and subsequent steps, and determination of fuel viscosity is performed. When either of the conditions is not satisfied, the flowchart of FIG. 4 is terminated at this point.

Specifically, the quasi-steady state is defined according to whether a variation amount $\Delta$Qf of the fuel injection amount does not exceed a predetermined value Qst per unit time during idle running or when the vehicle is running steadily at 40 km/hr, for example.

Alternatively, it is defined according to whether a variation amount ΔCL of the accelerator depression amount per unit time does not exceed a predetermined value CLst, and a variation ΔNe of the engine speed per unit time does not exceed a predetermined value Nest.

Fuel viscosity determining conditions are defined to be that a fuel temperature Tf is within a predetermined temperature range, and that a variation amount ΔITi of the real injection timing per unit time does not exceed a threshold value ITisd.

In the step S44, a static injection timing ITTPS obtained from an output signal from the timer piston position sensor 30 and a dynamic injection timing ITNLS (=ITi) obtained from output signals from the rotation speed sensor 23 and nozzle lift sensor 28, are read.

Next, in a step S45, a retardation period ΔIT is calculated by the following equation:

$$\Delta IT = ITTPS - ITNLS$$

Figure 5:
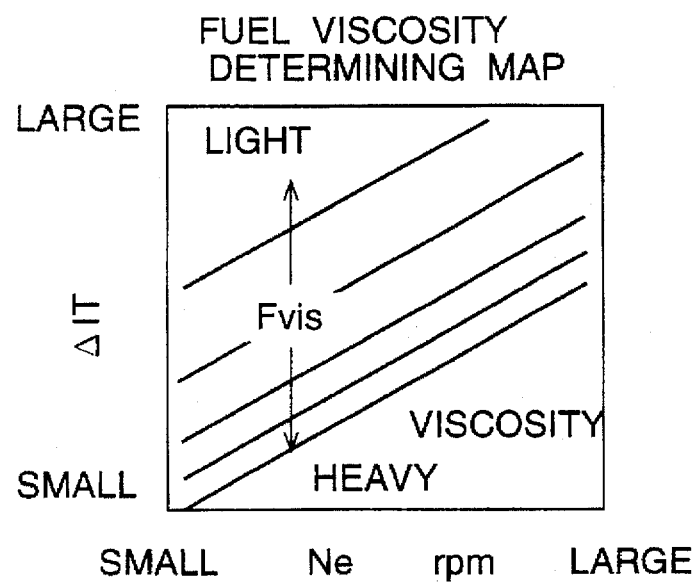
FIG. 5 is a diagram showing characteristics of a fuel viscosity determining table used by the controller.

In a step S46, a table having FIG. 5 as contents is looked up from this ΔIT, and a fuel viscosity determining index Fvis is calculated.

Figure 6:
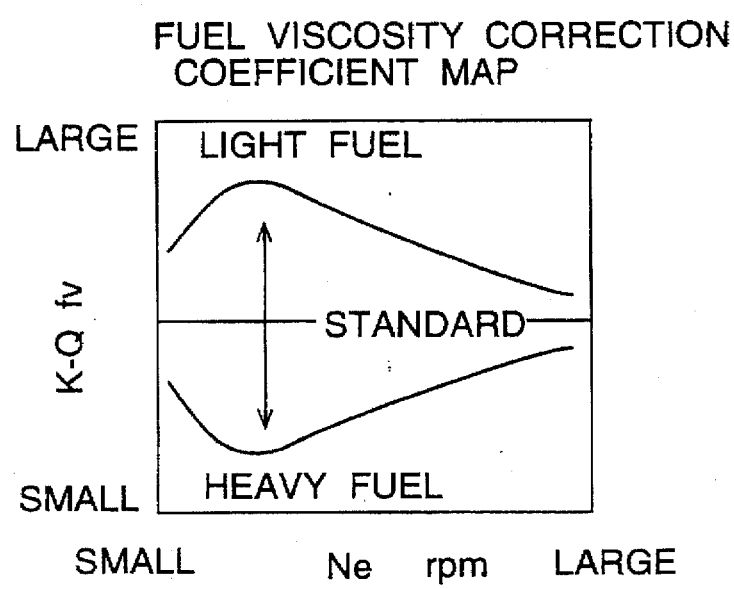
FIG. 6 is a diagram showing characteristics of the fuel viscosity correction coefficient map used by the controller.

A map having FIG. 6 as contents is looked up from the fuel viscosity determining index Fvis and engine speed Ne, and the fuel viscosity correction coefficient K-Qfv is calculated.

As shown in FIG. 5, the value Fvis which represents the fuel viscosity is such that the fuel is lighter the larger ΔIT is for the same engine rotation speed, and the fuel is heavier the higher the engine rotation speed is for the same ΔIT.

The characteristics shown in FIG. 6 are the same as those shown in the function S11 in FIG. 3, although the method of displaying them is different.

Hence, after the target fuel injection amount is converted to a control sleeve position by basic pump characteristics based on standard fuel, the control sleeve position is corrected according to the fuel viscosity, i.e. to supply more fuel when the fuel is light, and supply less fuel when the fuel is heavy. The control sleeve is controlled to the position after correction as a target value, so the fuel injection amount does not vary even when the fuel viscosity varies.

Therefore even when fuel of different viscosity to that of standard fuel is used, during for example idle rotation speed control, the engine does not stop due to an insufficient fuel injection amount, nor does idle rotation become unstable due to an excess injection amount. Also during normal running conditions when the engine is not running idle, the accelerator response is not impaired nor does it become over-sensitive.

Figure 7:
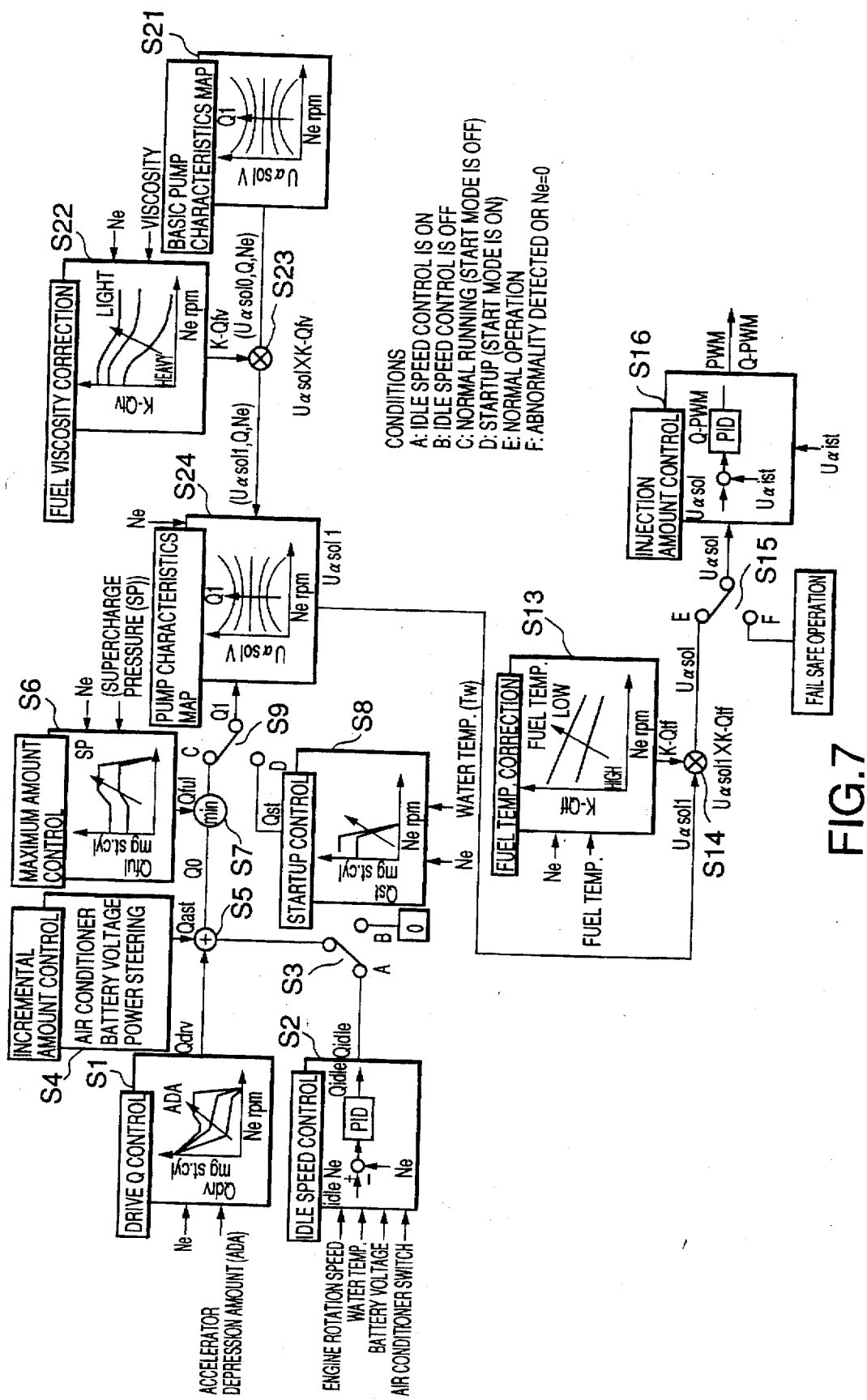
FIG. 7 is similar to FIG. 3, but showing a second embodiment of this invention.

FIG. 7 shows a second embodiment of this invention.

The only differences between this figure and the aforesaid first embodiment are the functions S21, 22, 23 and 24.

Here, the basic pump characteristics are updated according to the detected value of fuel viscosity in the functions S21, S22, S23.

In the function S24, using the pump characteristics after updating, the target injection amount Q1 (same as the value in FIG. 3) is converted to a target rotary solenoid output voltage.

For this purpose, firstly, the basic pump characteristics are stored as a map in the function S21, and the fuel viscosity correction coefficient characteristics are stored as a map in the function S22.

The fuel viscosity correction coefficients are sets of two-dimensional data (K-Qfv, Ne), and the basic pump characteristics are sets of three-dimensional data (Uαsol0, Q1, Ne).

The calculation of Uαsol0×K-Qfv is therefore performed for each engine rotation speed Ne, and the calculation results are taken as a new target rotary solenoid output voltage Uαsol1 so as to generate the three-dimensional data (Uαsol1, Q1, Ne). When this new three-dimensional data is used, pump characteristics suited to the detected value of fuel viscosity are obtained.

It should be noted that the fuel viscosity varies only when off is supplied, so when the load on the control unit is low, the updating of pump characteristics may be performed as a background job.

According to the aforesaid first embodiment, the looking up of a fuel viscosity correction coefficient map on each fuel injection constitutes a predetermined calculation load in the control unit. According this second embodiment, however, after the pump characteristics are updated, the same pump characteristic map is used until the fuel viscosity changes again, so the calculation load on the control unit 21 is kept low. This embodiment is therefore suited to the case where the processing speed of the control unit 21 is slow, or where one of the control units 21 has to perform other control in addition to that of fuel injection amount.

Figure 8:
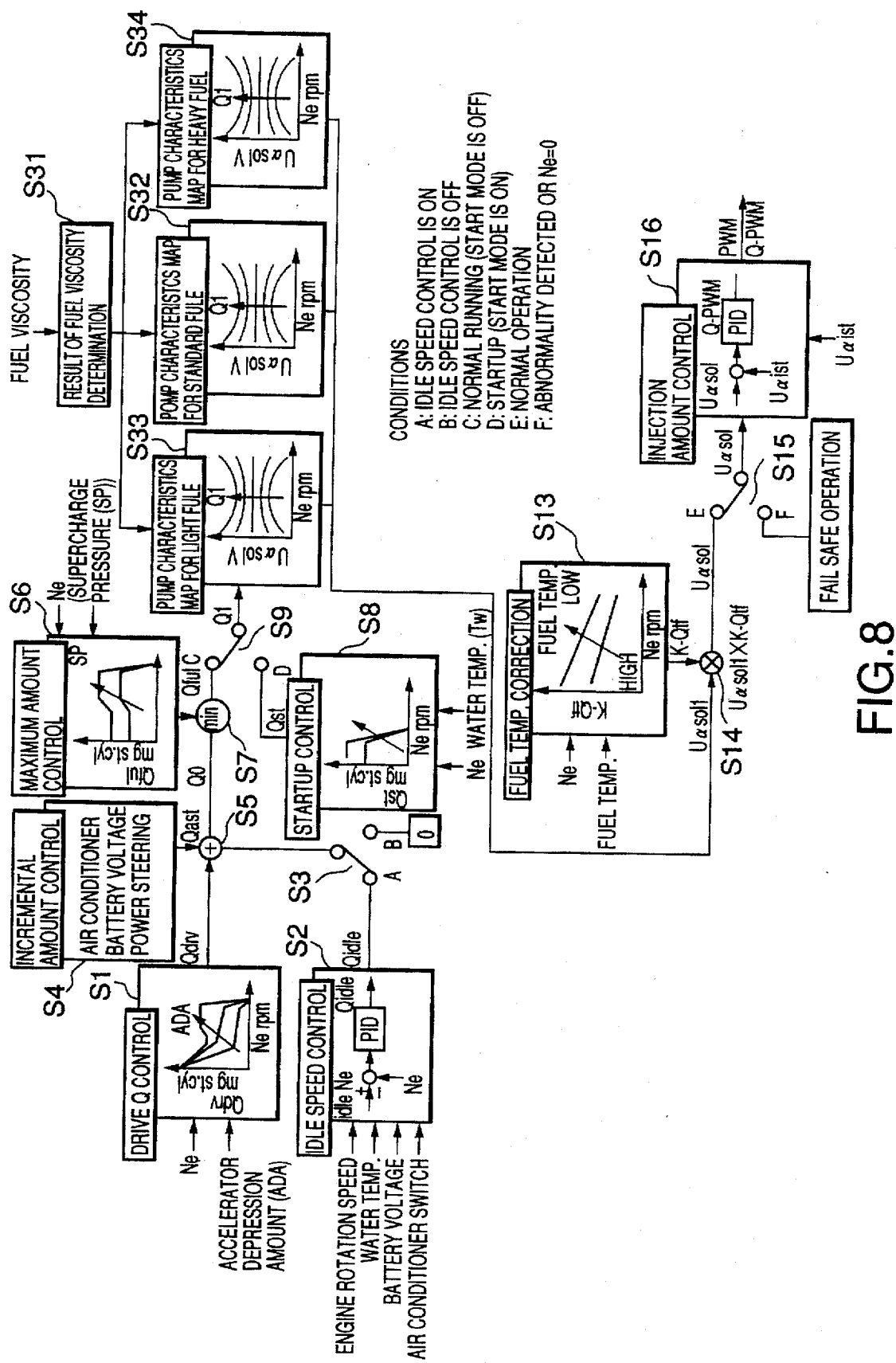
FIG. 8 is similar to FIG. 3, but showing a third embodiment of this invention.

FIG. 8 shows a third embodiment of the invention.

The only differences between this figure and the first embodiment are the functions S31, 32, 33 and 34.

Herein, the functions S32, S34 are first provided as a map of pump characteristics for light fuel and heavy fuel in addition to the basic pump characteristics of the function S33.

When the viscosity of the fuel used is different from that of standard fuel in the determination of the S31, either of the functions S32-S34 is selected according to the fuel viscosity, and the target rotary solenoid output voltage Uαsol1 is calculated.

However, although the general terms light fuel and heavy fuel have been used, the fuel viscosity varies widely. Therefore, to increase the precision of injection amount control, pump characteristic maps respectively suited to the lightest and heaviest fuels are prepared, and when for example the viscosity of the fuel used is between that of standard fuel and the lightest fuel, a value obtained by performing an interpolation between the basic pump characteristics and the pump characteristics for the lightest fuel, may be taken as the target rotary solenoid output voltage Uαsol1.

This third embodiment is effective in an engine comprising an injection system having special pump characteristics where a proper correction cannot be made even when the target rotary solenoid output voltage looked up from the basic pump characteristic map, is multiplied by a fuel viscosity correction coefficient. For example, the control sleeve position can be precisely corrected according to the fuel viscosity even in a pump having a variable injection rate mechanism. Examples of a variable injection rate mechanism known in the art are step spill port (SSP) and variable injection pattern (VIPS) control.

Next, a fourth embodiment of this invention will be described.

Injection pumps having a variable injection rate mechanism, or injection pumps used in a direct injection type diesel engine having a high injection nozzle opening pressure, have special injection characteristics, and the displacement point varies in the region of the engine idle rotation speed. In particular, therefore, idle control may become unstable when light fuel is used and the engine may stop. The displacement point refers to a region where the fuel injection amount largely fluctuates due to only a slight difference of pump rotation speed.

Figure 9:
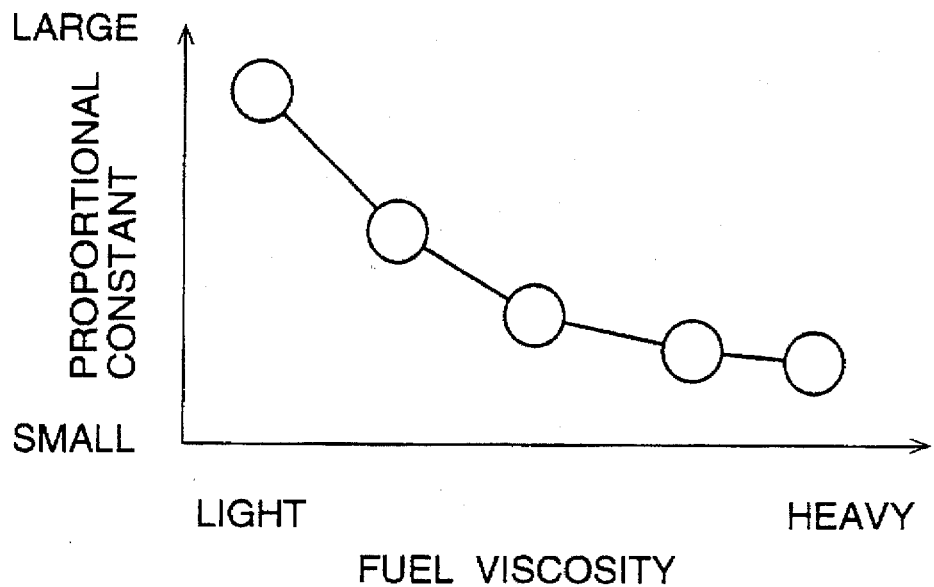
FIG. 9 is a diagram showing the characteristics of a proportional constant used by a controller according to a fourth embodiment of this invention.

To deal with this, the inventor found by experiment that if, after applying any of the aforesaid first, second or third embodiments to correct the fuel injection amount according to the fuel viscosity, a good result could be obtained by varying the proportional constant used in the proportional calculation of PID control during idle rotation according to the fuel viscosity, as shown in FIG. 9.

In other words, by making the proportional constant larger when light fuel is used than when heavy fuel is used, a larger fuel injection amount correction Qidle is obtained when the idle rotation speed falls below the target value, and the system returns to the target value with a good response.

More specifically, a proportional constant table corresponding to FIG. 9 is prepared, a proportional constant is found according to the fuel viscosity by looking up this table, and the fuel injection amount correction Qidle is calculated using this proportional constant by the following equation:

$$Qidle = \text{proportional term} + \text{integral term} + \text{differential term} = KP \times KpfP \times e(n) + KI \times Kpfl \times e(n) + YI(n-1) + KD \times KpfD \times (e(n) - e(n-1))$$

where, $e(n)$=error on present occasion (target value−actual value)

$e(n-1)$=error on immediately preceding occasion

KP=proportional constant

KI=integral constant

KD=differential constant

KpfP=prescaling factor for proportionality

KpfI=prescaling factor for integration

KdfD=prescaling factor for differentiation $YI(n-1)$=integral term on immediately preceding occasion According to this embodiment, idle drive control may be appropriately performed when light fuel is used even in an engine comprising an injection pump having special injection characteristics with a displacement point in the vicinity of the idle rotation speed.

Next, a fifth embodiment of this invention applied to fuel injection timing control, and a sixth embodiment of this invention applied to EGR control, will be described.

In conventional fuel injection timing control, a fuel injection timing for normal running conditions is calculated for example according to the engine speed and target injection amount, and this is converted to a command signal output to the timing control valve. In conventional EGR control, a target EGR valve lift amount and target intake throttle valve opening are calculated according to the engine speed and target injection amount, the target EGR valve lift amount is converted to an EGR valve control signal, and the target intake throttle valve opening is converted to an intake throttle valve control signal.

As described heretofore, in injection pumps where the control sleeve position is adjusted assuming standard fuel, the actual fuel injection amount decreases when light fuel is used. As a result, the target injection amount during feedback control is estimated larger than the actual fuel injection amount.

Figure 11:
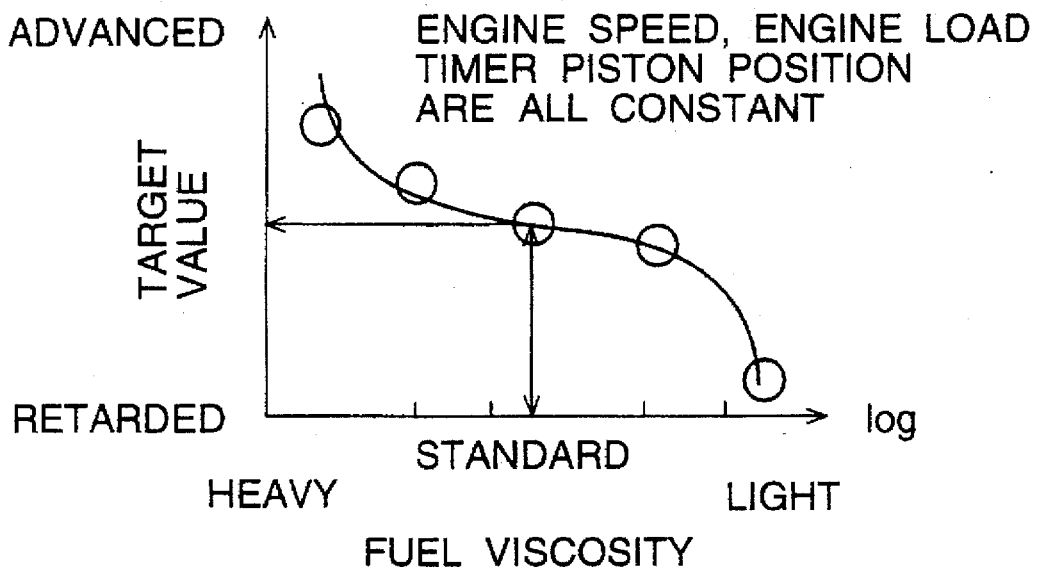
FIG. 11 is a diagram showing scatter of injection timing due to fuel viscosity variation in an ordinary distribution type fuel injection pump.

Therefore, when the target fuel amount is used as a control parameter for calculating the fuel injection timing, the fuel rejection timing is retarded relative to the target value as shown in FIG. 11. Conversely, when heavy fuel is used, the fuel injection timing is advanced relative to the target value.

Figure 14:
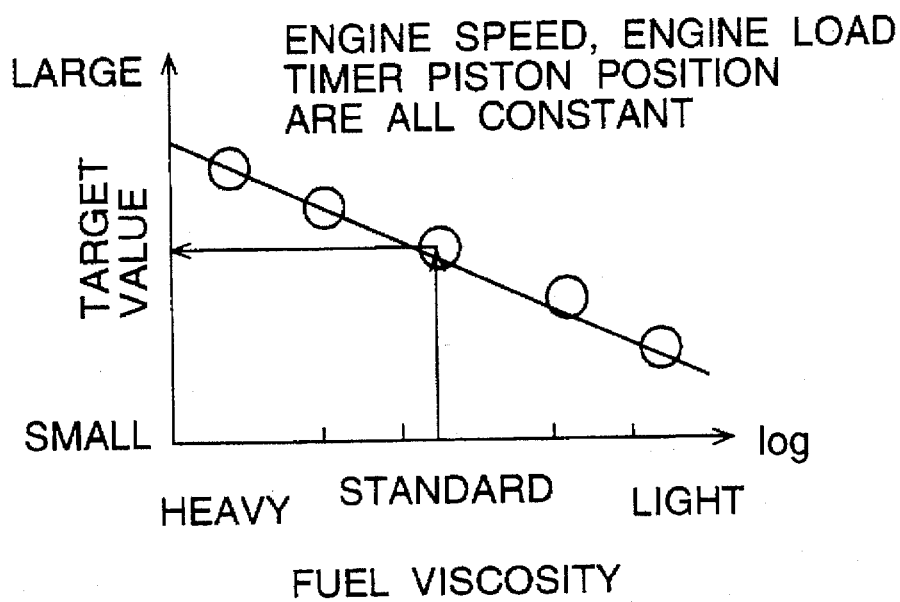
FIG. 14 is a characteristic diagram showing scatter of EGR amount due to fuel viscosity variation in an ordinary distribution type fuel injection pump.

Further, when the target injection amount is used as a control parameter for calculating the target EGR valve lift amount or target intake throttle valve opening, the EGR amount is decreased relative to the target value as shown in FIG. 14. Conversely, when heavy fuel is used, the EGR amount is increased relative to the target value.

To deal with this, in the fifth and sixth embodiments, a value of the target injection amount corrected by the detected value of fuel viscosity is used as a control parameter.

Figure 10:
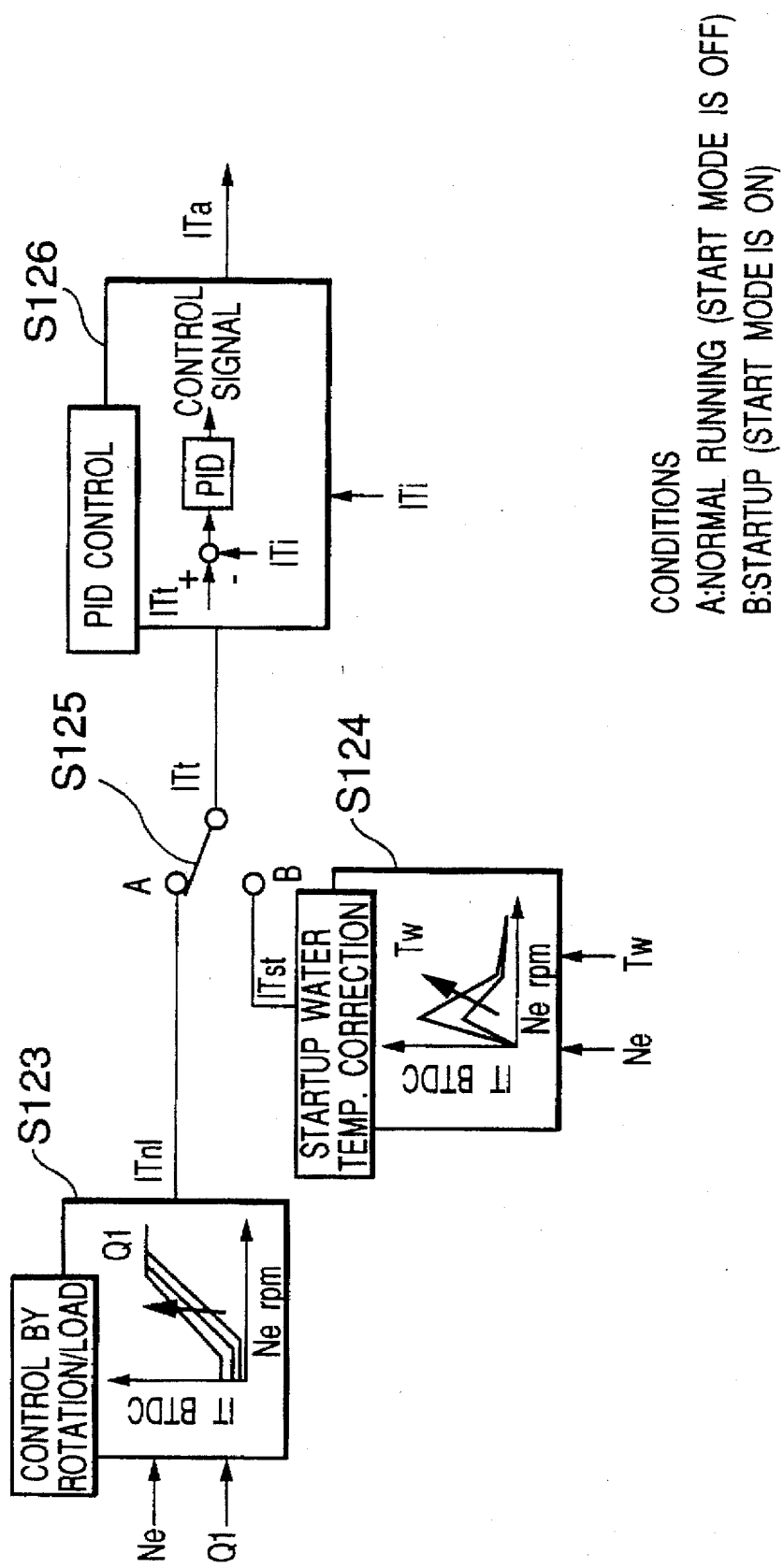
FIG. 10 is a block diagram describing a fuel injection timing control function of a controller according to a fifth embodiment of this invention.
Figure 13:
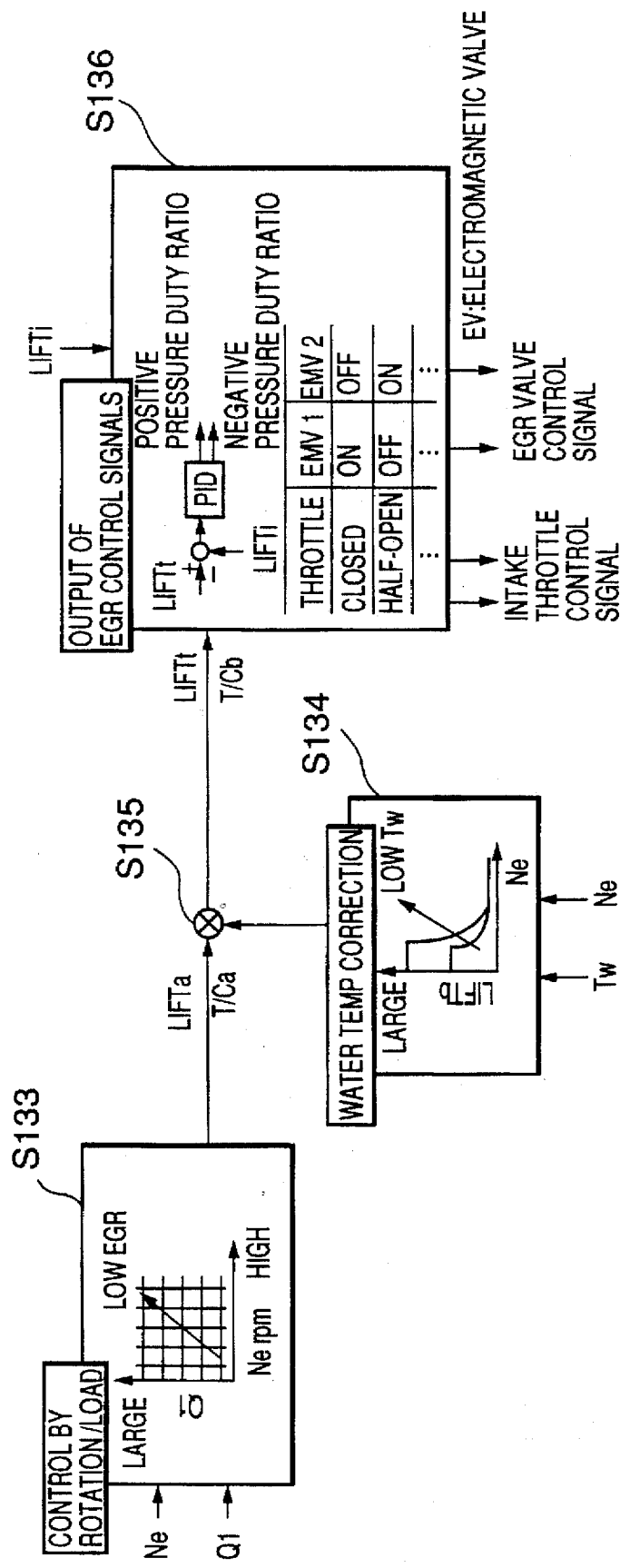
FIG. 13 is a block diagram describing an EGR amount control function of a controller according to a sixth embodiment of this invention.

FIG. 10 shows the control contents of the fuel injection timing in the fifth embodiment, and FIG. 13 shows the control constants of the EGR amount in the sixth embodiment.

These embodiments assume that any of the aforesaid first, second or third embodiments is implemented, so FIG. 10 appears no different from the conventional fuel injection timing control and FIG. 13 is no different from the conventional EGR amount control.

According to the aforesaid three embodiments, the target injection amount Q1 or the measured fuel injection amount precisely represents the engine load without being affected by the fuel viscosity. Therefore, there is no need to correct for the fuel viscosity.

On the other hand, when this invention is applied only to fuel injection timing control or EGR amount control and not to fuel injection amount control, an eighth embodiment described hereafter must be applied instead of the fifth embodiment, and a ninth embodiment described hereafter must be applied instead of the sixth embodiment.

First, describing the fifth embodiment, rotation/load characteristics (map) of injection timing are looked up from the target injection amount Q1 and rotation speed in a function S123 in FIG. 10, and a fuel injection timing ITnI during normal running conditions is found. Also, startup injection timing retardation characteristics (map) are looked up from the rotation speed Ne and cooling water temperature Tw in a function S124, and a startup injection timing retardation value ITst is found.

In a function S125, it is determined whether or not the engine is starting up. When it is starting, the routine switches to the section B, and at all other times it switches to the section A. In a function S126, the target injection timing ITt (during normal running conditions, ITt=ITnI, and during startup, ITt=ITst) is compared with the actual injection timing ITi measured by the rotation speed sensor 23 and nozzle lift sensor 28. The displacement amount of the timer piston 9 is then calculated, an injection timing control actuator command signal ITa is output by PID control, and the target injection timing is thereby controlled to a target timing.

The injection timing control of this embodiment is based on a comparison of the target injection timing ITt and the actual injection timing ITi, but injection timing control may also be performed based on a comparison of the target timer piston position according to speed and load, and the actual timer piston position.

Figure 12:
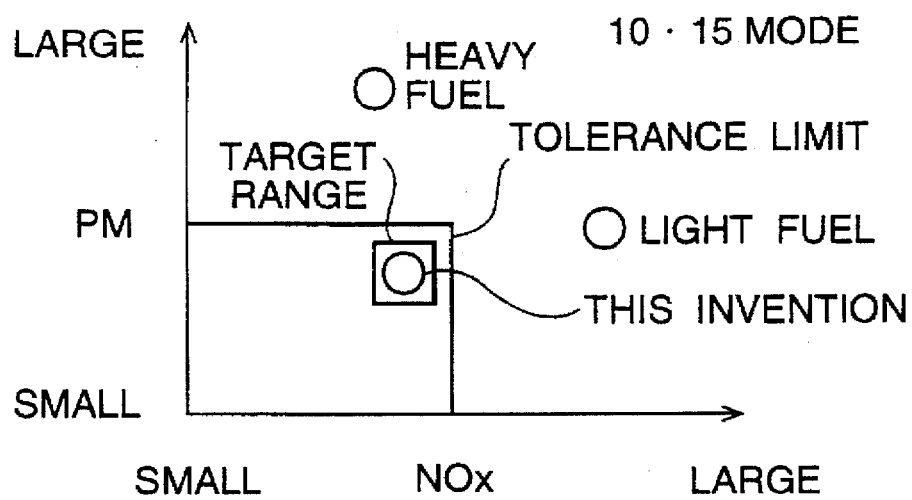
FIG. 12 is a diagram showing an effect of suppressing particulates and NOx according to the fifth embodiment.

By applying the fuel injection amount control of the aforesaid first, second or third embodiments, the fuel injection amount may be controlled without being affected by the fuel viscosity. Hence, according to the fifth embodiment where the target injection amount in these embodiments is used as a control parameter for calculating the fuel injection timing, the fuel injection timing is kept within tolerance limits even when fuel of different viscosity is used, exhaust emission can always be kept within tolerance limits regardless of fuel viscosity as shown in FIG. 12, and deterioration of drivability is prevented.

Next, the sixth embodiment of this invention will be described referring to FIGS. 13–16.

Figure 16:
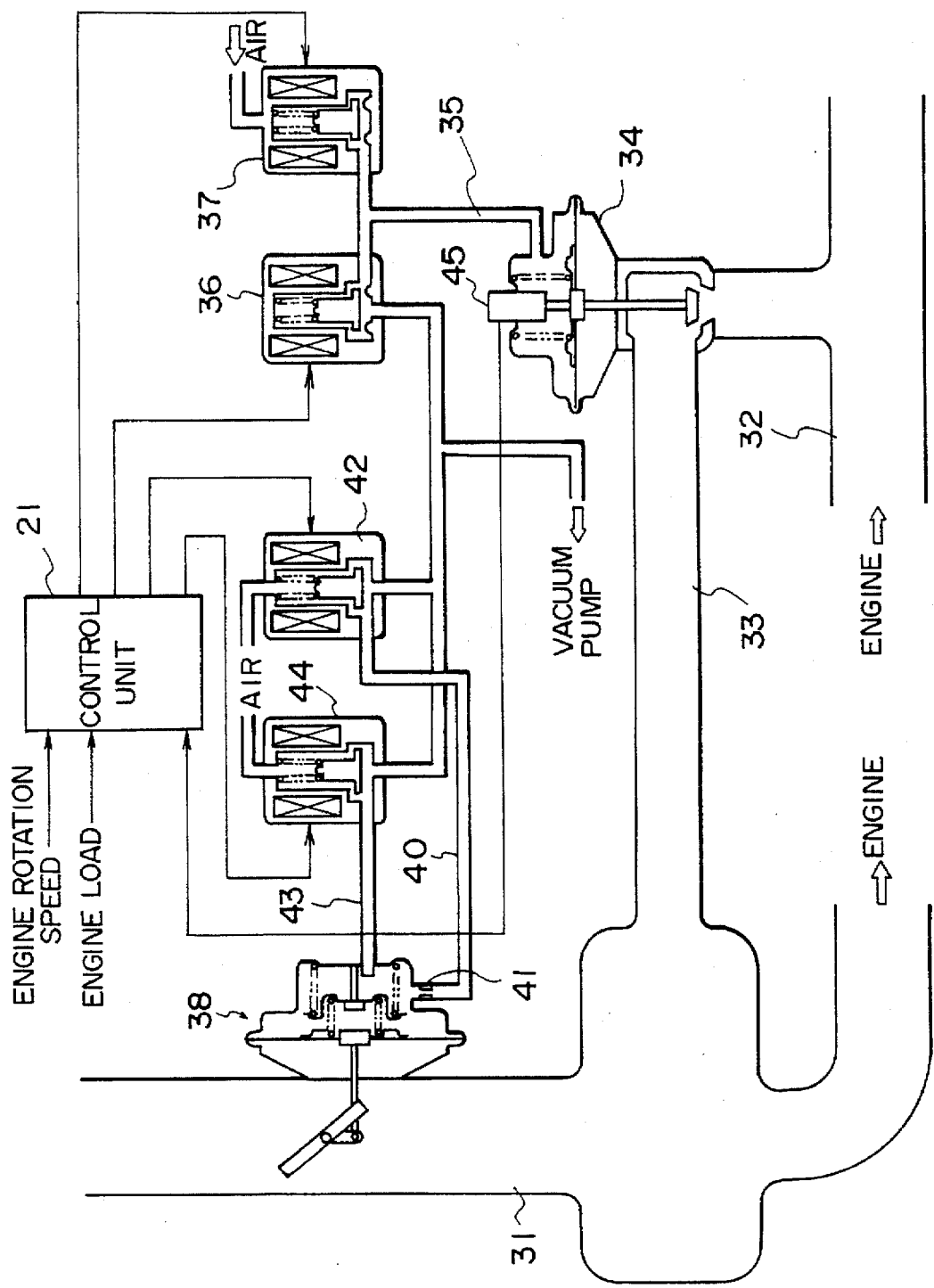
FIG. 16 is a schematic diagram of another EGR device to which the sixth embodiment may be applied.

This embodiment is applied to an engine comprising an EGR mechanism shown in FIG. 16.

This EGR mechanism comprises an EGR passage 33 for recycling part of the exhaust in an exhaust passage 32 to the engine combustion chamber. A diaphragm type EGR valve 34 is provided midway along the EGR passage 33. The EGR valve 34 is opened and shut according to a negative pressure supplied via a negative pressure passage 35 from a vacuum pump, not shown. This negative pressure is controlled by a pair of duty control valves 36, 37. The lift position of the EGR valve 34 is detected by a lift sensor 45, and input as a signal to the control unit 21.

Figure 17:
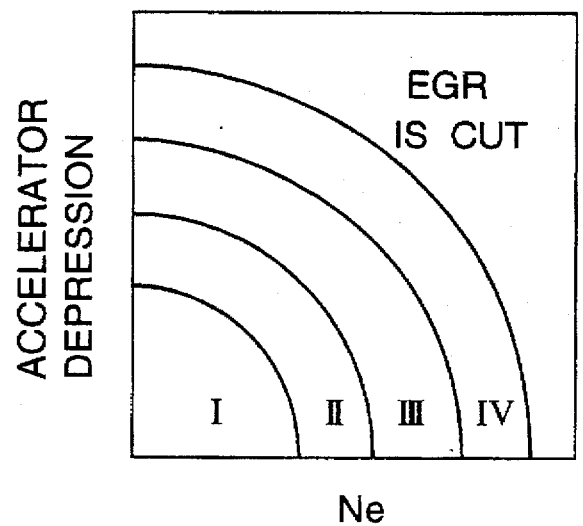
FIG. 17 is a diagram showing control regions of the EGR controller of FIG. 16.

A two-stage diaphragm intake throttle valve 38 is installed in an engine intake passage 31. The intake throttle valve 38 varies the cross-sectional area of the intake passage 31 according to a negative pressure supplied from the vacuum pump via a negative pressure passage 40, and a negative pressure supplied from the vacuum pump via a negative pressure passage 43. An electromagnetic valve 42 and orifice 41 are provided in the negative pressure passage 40, and an electromagnetic valve 44 is provided in the intake passage 43. The duty control valves 36, 37 and electromagnetic valves 42, 44 open and shut according to control signals output by the control unit 21, and the EGR amount is varied in four stages according to the engine running conditions as shown in FIGS. 17 and 18. Alternatively, the EGR is cut by shutting all these valves.

The control unit 21 looks up an EGR valve lift amount rotation/load map from the target injection amount Q1 and engine rotation speed Ne in a function S133 shown in FIG. 13, and calculates a target EGR valve lift amount LIFTa. An intake throttle opening rotation/load map is also looked up, and a target intake throttle opening T/Ca calculated.

In a function S134, water temperature correction characteristics are looked up from the engine rotation speed Ne and cooling water temperature Tw detected by the water temperature sensor 24, a water temperature correction amount LIFTb is calculated, and this is then multiplied by the target EGR valve lift amount LIFTa and target intake throttle opening T/Ca.

In a function S 136, a target EGR lift amount LIFTt after water temperature correction (=LIFTa×water temperature correction amount) and an EGR valve lift amount LIFTi measured by the lift sensor 45, are compared. Also, a target intake throttle opening T/Cb after water temperature correction (=T/Ca×water temperature correction amount) and a measured intake throttle valve opening T/Ci (distinguished from the operating state of the intake throttle actuator), are compared.

PID control is performed for each of these, and an EGR valve control signal and intake throttle control signal are output so as to control the EGR amount.

Figure 15:
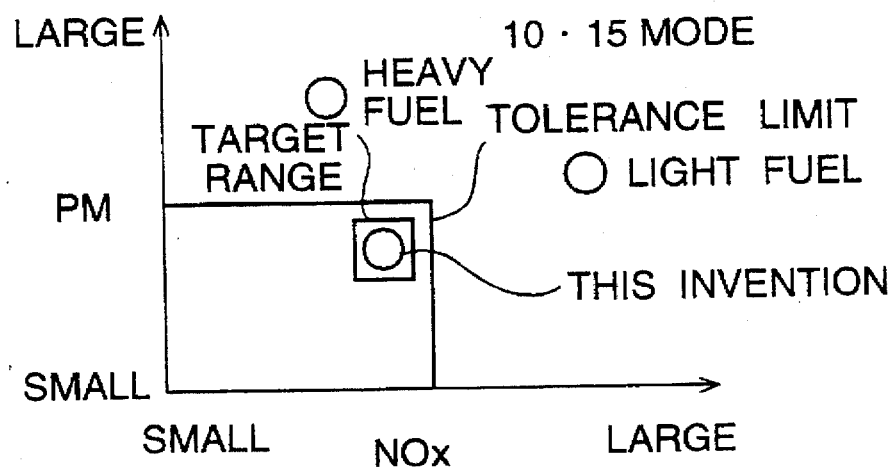
FIG. 15 is a diagram showing an effect of suppressing particulates and NOx according to the sixth embodiment.

By applying the fuel injection amount control of the aforesaid first, second or third embodiments, the fuel injection amount can be controlled without being affected by the fuel viscosity. Hence, according to the sixth embodiment where the EGR amount is determined using the target fuel injection amount as a control parameter, there is not much scatter of the EGR amount due to fuel viscosity even when fuel of different viscosity is used. As a result, exhaust emissions can be always be kept within tolerance limits regardless of fuel viscosity as shown in FIG. 15, and deterioration of drivability is prevented.

The sixth embodiment concerns engines in which the EGR amount is controlled in a stepwise fashion, however the same algorithm may be applied to engines having a control mechanism wherein the EGR amount is varied continuously.

FIGS. 19–26 show a seventh embodiment of this invention. This embodiment concerns engines in which the air-fuel ratio is also used as a control parameter in addition to the fuel injection amount expressed by the engine speed and engine load, in order to control the EGR amount or the maximum fuel injection amount.

The seventh embodiment assumes that one of the aforesaid first, second or third embodiments is applied to fuel injection amount control. When this invention is applied only to control of the EGR amount without applying it to fuel injection amount control, a tenth embodiment must be applied instead of the seventh embodiment.

Figure 26:
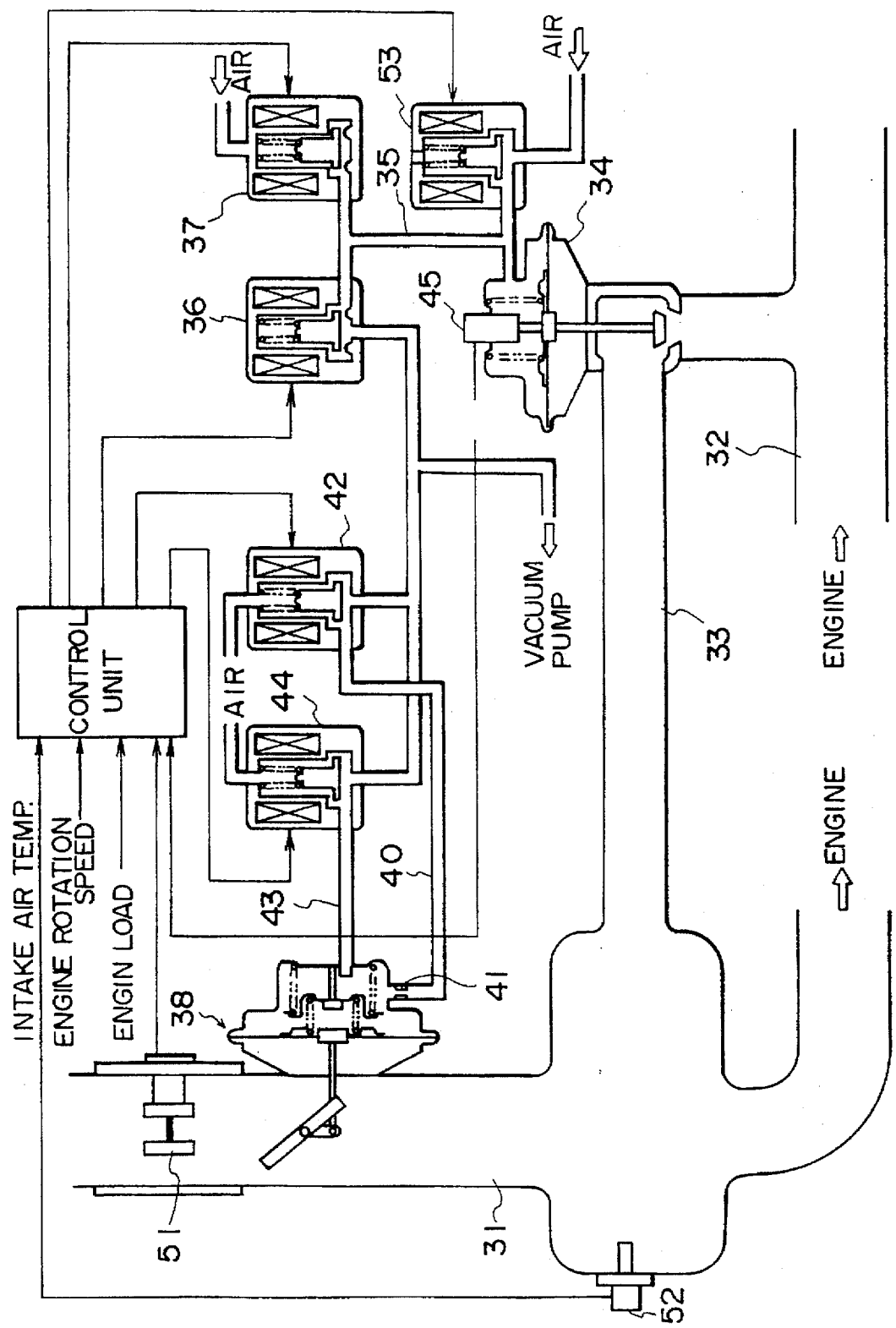
FIG. 26 is a schematic diagram of an EGR device when the EGR amount control of the seventh embodiment is applied to the aforesaid first, second or third embodiments.

This embodiment is applied to an engine comprising an EGR mechanism shown in FIG. 26. FIG. 26 is similar to the EGR mechanism of FIG. 16 described in the aforesaid sixth embodiment, but further comprises an air flow meter 51 which detects an engine intake air amount, intake air temperature sensor 52 and an EGR cut valve 53 which immediately shuts off the EGR passage 33.

As described hereinabove, in injection pumps where the control sleeve position is adjusted based on standard fuel, the actual fuel injection amount decreases when light fuel is used even for the same control sleeve position. As a result, the target injection amount in feedback control is estimated larger than the actual fuel injection amount.

Therefore, if the air-fuel ratio is calculated using the target injection amount when light fuel is used, the calculated air-fuel ratio is shifted to a smaller value than the actual value, i.e. to the rich side. Likewise, when heavy fuel is used, the calculated air-fuel ratio is shifted to a larger value than the actual value, i.e. to the lean side.

According to the seventh embodiment, the target injection amount calculated by any of the aforesaid first, second or third embodiments, is used as a control parameter for calculating the air-fuel ratio.

Figure 19:
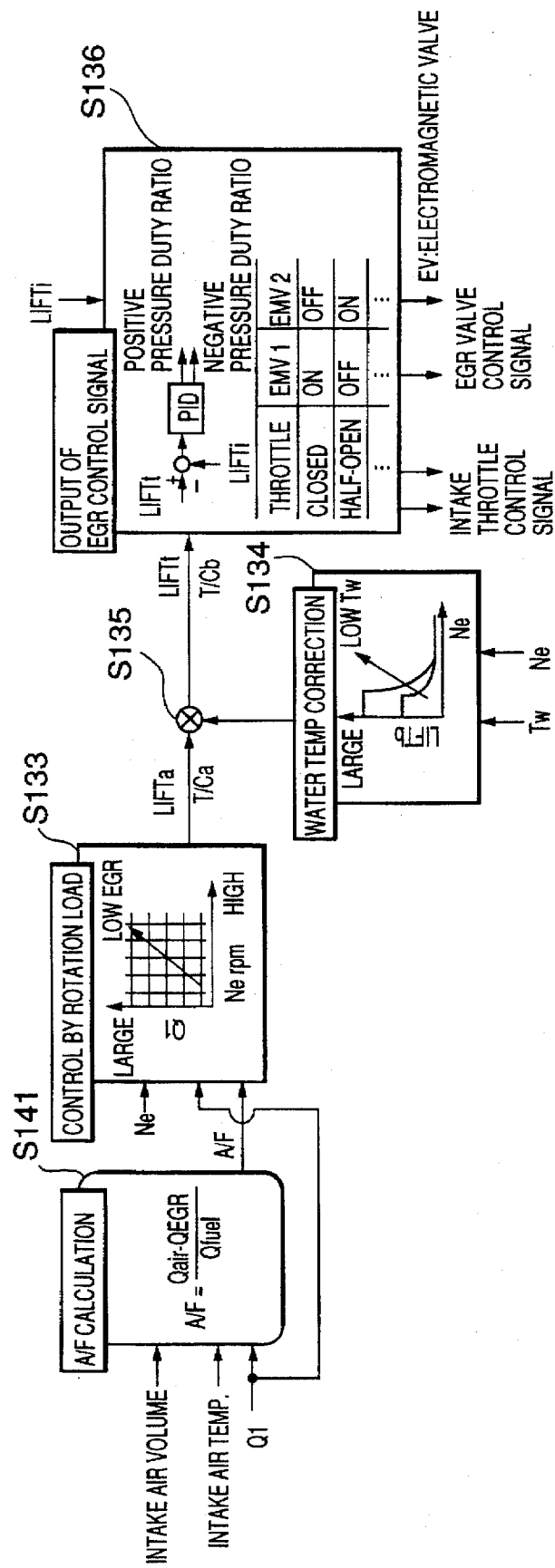
FIG. 19 is a block diagram describing an EGR amount control function of a controller according to a seventh embodiment of this invention.

Specifically, in a function S 141 in FIG. 19, an air-fuel ratio A/F is calculated based on an intake air volume detected by the air flow meter 51, intake air temperature detected by an intake air temperature sensor 52 and the target injection amount Q1. The target injection amount Q1 is the same as that described in FIG. 13. This A/F calculation will be described using the flowchart of FIG. 20.

Figure 20:
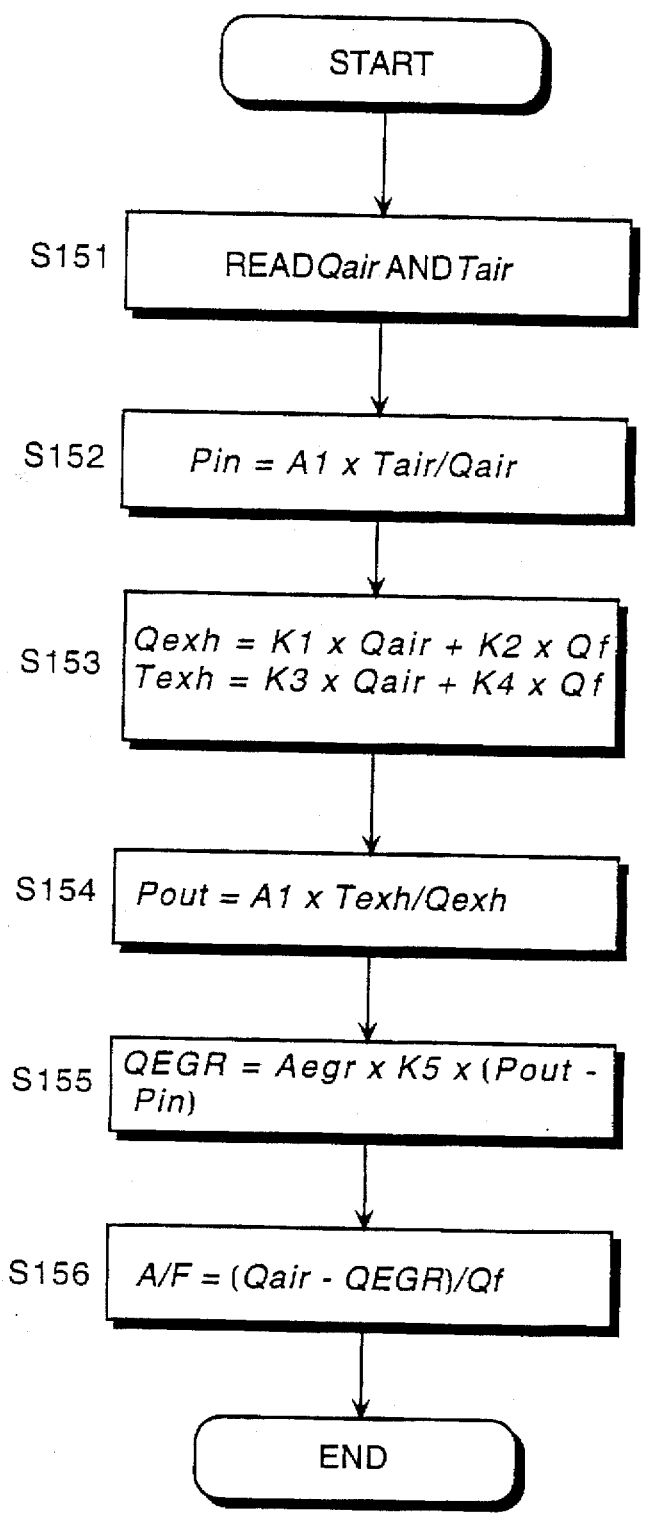
FIG. 20 is a flowchart describing an air-fuel ratio calculation process according to the seventh embodiment.

In a step S151 of FIG. 20, an intake air volume Qair and intake air temperature Tair, are read. In a step S152, an intake air pressure Pin downstream of the intake throttle 38 is calculated by the following equation:

$$Pin = A1 \times Tair / Qair \qquad (1)$$

where,

A1=constant

This equation is based on the state equation for a theoretical gas, i.e. PV=nRT, where P=gas pressure, V=gas volume, n=mole number of the gas, R=gas constant and T=gas temperature.

Figure 21:
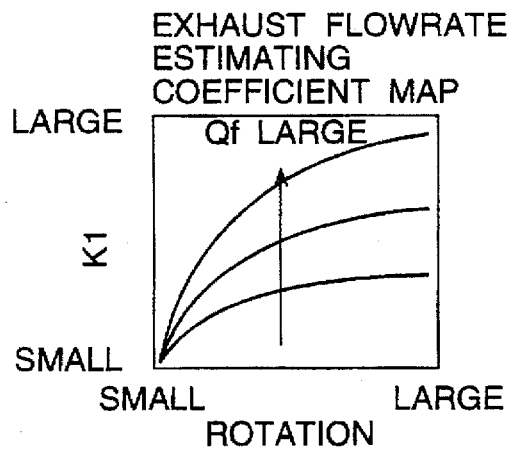
FIG. 21 is a diagram showing characteristics of an exhaust flowrate estimation coefficient according to the seventh embodiment.
Figure 22:
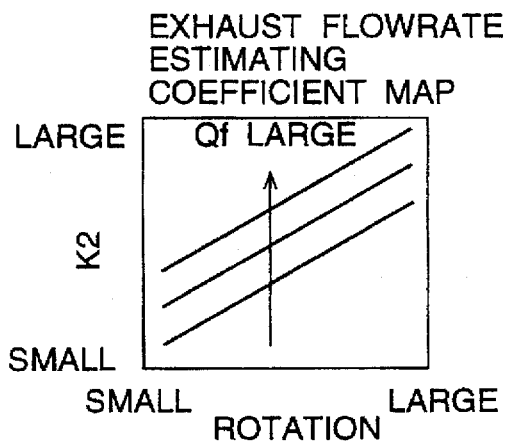
FIG. 22 is a diagram showing characteristics of an exhaust flowrate estimation coefficient map according to the seventh embodiment.
Figure 23:
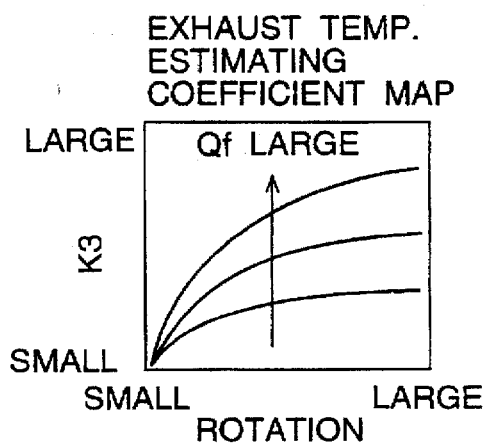
FIG. 23 is a diagram showing characteristics of an exhaust temperature estimation coefficient map according to the seventh embodiment.
Figure 24:
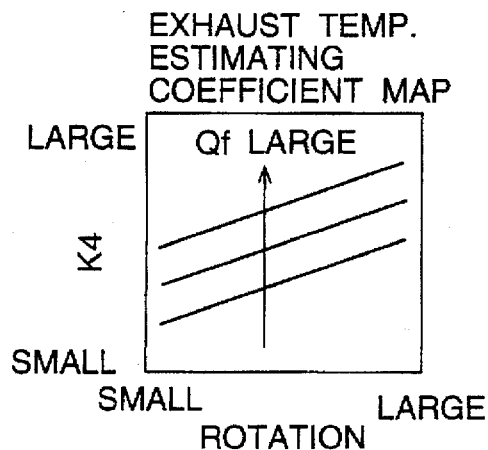
FIG. 24 is a diagram showing characteristics of another exhaust temperature estimation coefficient map according to the seventh embodiment.

In a step S153, maps having FIG. 21 and FIG. 22 as contents are looked up from the intake air volume Qair and fuel injection amount Qf, and exhaust flowrate estimation coefficients K1 and K2 are found. Maps having FIG. 23 and FIG. 24 as contents are also looked up, and exhaust temperature estimation coefficients K3 and K4 are found. The exhaust flowrate Qexh and exhaust temperature Texh are then calculated using these values by the following equations:

$$Qexh = K1 \times Qair + K2 \times Qf \qquad (2)$$

$$Texh = K3 \times Qair + K4 \times Qf \qquad (3)$$

where,

Qf=fuel injection amount

Finally, considering engine heat loss, fuel heat generation amount and flow inside pipes (Bernouilli's equation), the exhaust temperature and exhaust flowrate are both given as parameters of intake air amount and fuel injection amount. If the coefficients K1–K4 of the exhaust temperature estimation and exhaust flowrate estimation equations (2), (3) are first found by experiment, and they are stored in a memory of the control unit 21 as the maps shown in FIGS. 21–24, the exhaust gas temperature and exhaust gas flowrate may be found by looking up these maps from the engine rotation speed and fuel injection amount Qf.

In a step S154, an exhaust passage pressure Pout is calculated by the following equation as in the case of the step S152:

$$Pout = A1 \times Texh/Qexh \tag{4}$$

where,

A1=constant.

In a step S155, QEGR which is an exhaust gas weight is calculated by the following equation using a difference between Pout and Pin, and an exhaust gas weight estimation coefficient K5:

$$QEGR = Aegr \times K5 \times (Pout - Pin) \tag{5}$$

where,

Aegr=EGR valve opening area

In a step S156, the air-fuel ratio A/F is calculated by the following equation:

$$A/F = (Qair - QEGR)/Qf \tag{6}$$

Figure 25:
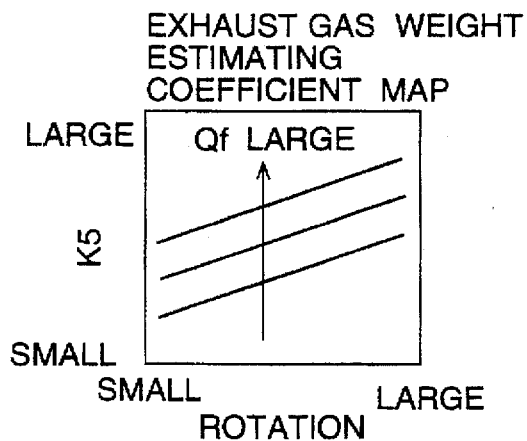
FIG. 25 is a diagram showing characteristics of an exhaust gas weight estimation coefficient map according to the seventh embodiment.

K5 in equation (5) is also first stored in the memory of the control unit 21 as a map from experiment, as shown in FIG. 25. Aegr is found by looking up a table first stored in the memory of the control unit 21 from the EGR valve lift amount.

When calculation of the air-fuel ratio A/F is complete, the routine returns to the function S142 of FIG. 19, and the target EGR valve lift amount and target intake throttle opening are looked up relative to the calculated air-fuel ratio from a predetermined map, based on the calculated air-fuel ratio A/F, engine rotation speed and target injection amount Q1.

In the function S142 of FIG. 1, the rotation/load characteristics of the EGR valve lift amount for intake throttle opening) have been drawn relative to a particular air-fuel ratio, however in practice, the rotation/load characteristics of the EGR valve lift amount and intake throttle opening for each of a plurality of representative air-fuel ratios are prepared. A map for the air-fuel ratio which coincides with the calculated air-fuel ratio is then selected from the maps available, and the target EGR valve lift amount and target intake throttle opening are found from the selected map.

In the seventh embodiment, by applying the fuel injection amount control of the aforesaid first, second or third embodiments, the same fuel injection amount as for standard fuel is supplied even when fuel of different viscosity is used. For this purpose, the target injection amount is used as a control parameter to calculate the EGR valve lift amount and intake throttle opening, and the target injection amount is also used as a control parameter for finding the calculated air-fuel ratio. The calculation error in the air-fuel ratio due to fuel viscosity when fuel of different viscosity is used, is thereby largely reduced, and worsening of exhaust emissions and deterioration of drivability due to the use of fuel of different viscosity, is thereby suppressed.

Hence in the seventh embodiment, the objectives of controlling the EGR amount using the air-fuel ratio as a control parameter are to improve the precision of calculating the EGR amount, decrease exhaust emissions and improve drivability. In this case, as the error in the fuel injection amount directly emerges as an error in the air-fuel ratio, it is necessary to correct the fuel injection amount based on the fuel viscosity so as to achieve these objectives.

Figure 27:
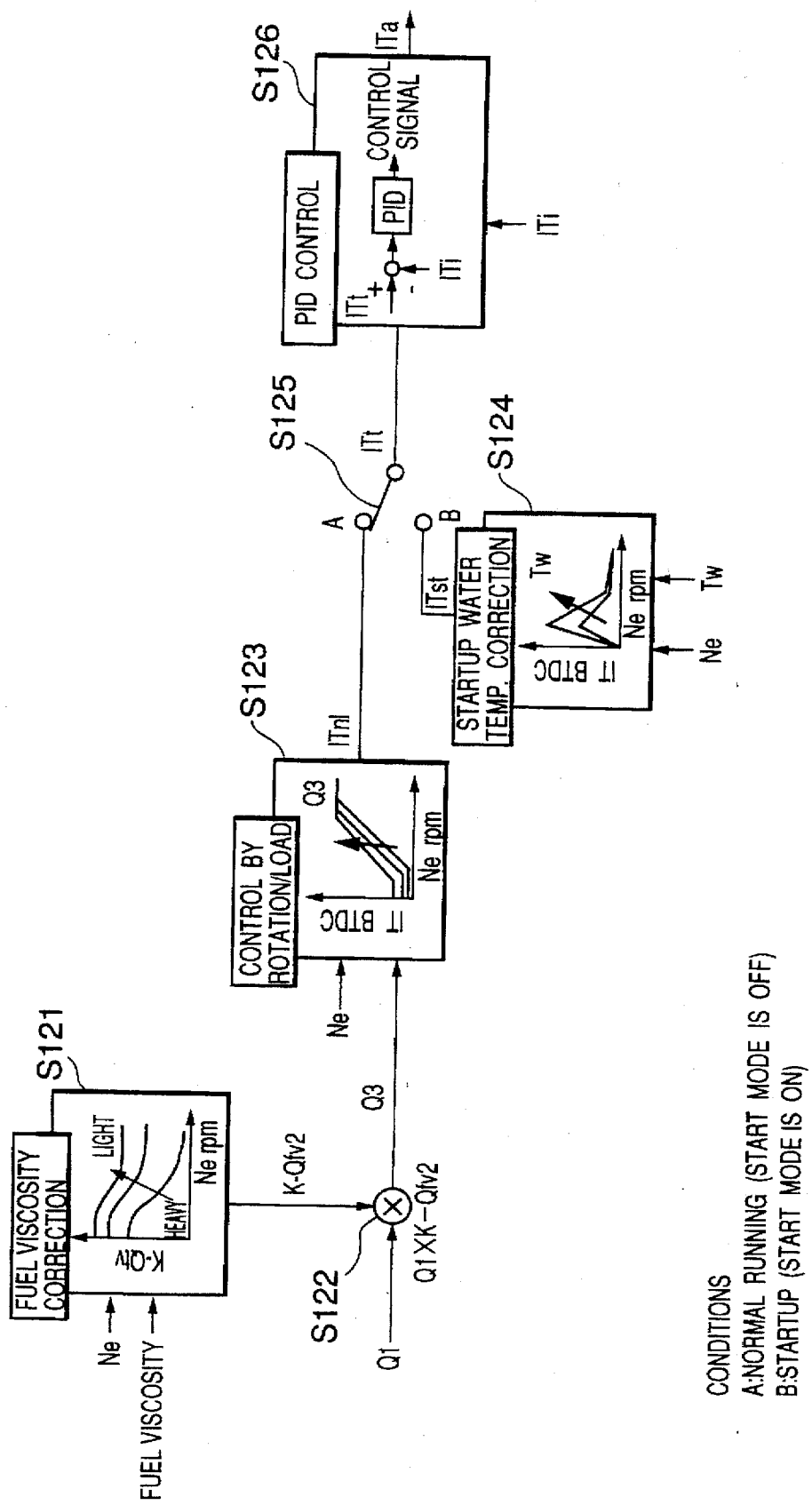
FIG. 27 is a block diagram describing a fuel injection timing control function of a controller according to an eighth embodiment of this invention.
Figure 28:
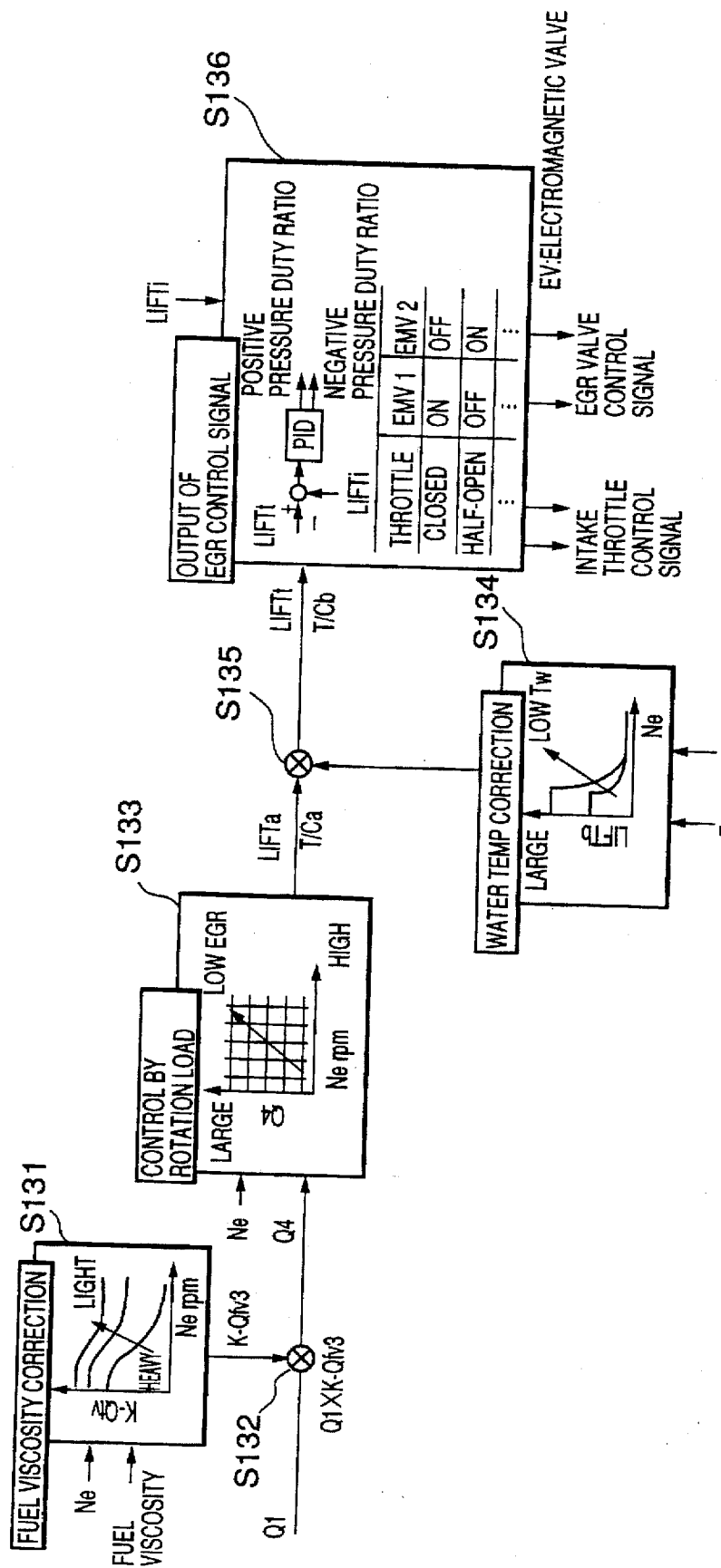
FIG. 28 is a block diagram describing an EGR amount control function of a controller according to a ninth embodiment of this invention.
Figure 29:
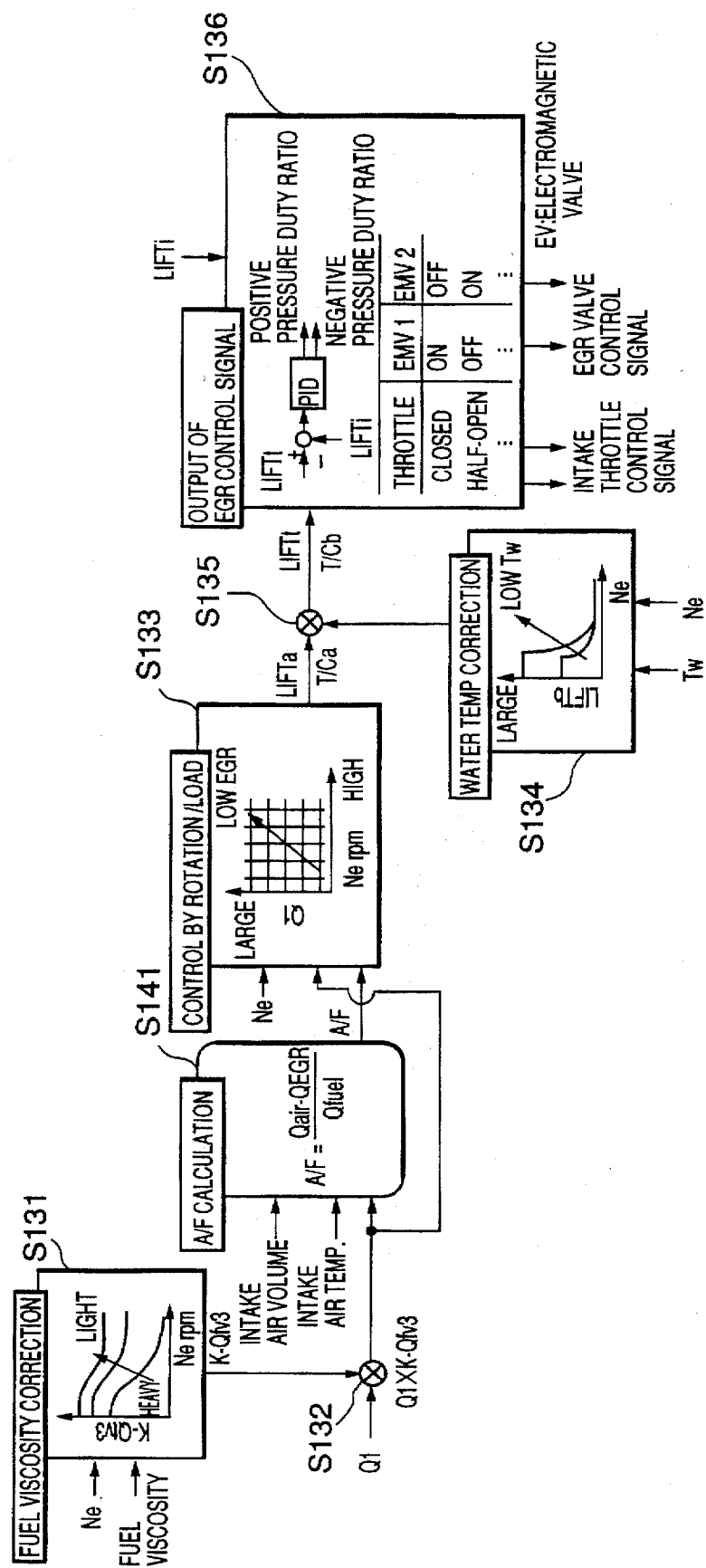
FIG. 29 is a block diagram describing an EGR amount control function of a controller according to a tenth embodiment of this invention.

The eighth embodiment of this invention is shown in FIG. 27, the ninth embodiment is shown in FIG. 28, and the tenth embodiment is shown in FIG. 29. FIG. 27 corresponds to FIG. 10, FIG. 28 corresponds to FIG. 13, and FIG. 29 corresponds to FIG. 19.

These eighth, ninth and tenth embodiments assume that the fuel injection amount is controlled as in the prior art without recourse to the aforesaid first, second or third embodiments. In these embodiments, therefore, unlike the fifth, sixth and seventh embodiments shown in FIG. 10, FIG. 13 and FIG. 19, the target injection amount Q1 must be corrected according to the fuel viscosity.

The main differences between the eighth–tenth and fifth–seventh embodiments may be summarized as follows.

The eighth embodiment relates to injection timing control.

According to this embodiment, firstly in a function S121, a predetermined map is looked up from the detected value of fuel viscosity and engine rotation speed, and a fuel viscosity correction coefficient K-Qfv2 for the target injection amount is calculated. Next, in a function S122, this correction coefficient is multiplied by the target injection amount Q1 found as in FIG. 3, and the value obtained is set as a new target injection amount Q3 (=Q1×K-Qfv2).

The value of the fuel viscosity correction coefficient K-Qfv2 has the same characteristics as those of the fuel viscosity correction coefficient K-Qfv in FIG. 3, and when light fuel is used, it is greater than 1. This is because when light fuel is used, the fuel injection amount used as a control parameter must be increased compared to when standard fuel is used so that the fuel injection timing is not retarded. Likewise, when heavy fuel is used, the fuel injection amount used as a control parameter must be decreased compared to when standard fuel is used, so the value of K-Qfv2 is less than 1.

According to this embodiment, the target injection amount Q1 is corrected by the fuel viscosity correction coefficient K-Qfv2. Instead of the target injection amount, the fuel injection amount may also be estimated from the fuel injection period detected by the control sleeve position sensor 26, and this estimated amount taken as In particular, in an engine in which the accelerator 14 is mechanically connected to the control sleeve 5, calculation of the target injection amount is not performed, hence the fuel injection period may be detected from the control sleeve position and the injection amount estimated from the injection period taken as Q1.

The ninth and tenth embodiments both relate to EGR amount control.

According to these embodiments in functions S131 and S132, a fuel viscosity correction coefficient Qfv3 is calculated relative to a target EGR valve lift amount and target throttle opening by looking up a predetermined map from the detected value of fuel viscosity and the engine speed, as in the case of the functions S121 and S122.

This correction coefficient Qfv3 is multiplied by the target injection amount Q1 found as in FIG. 3, and the value obtained is set to a new target injection amount Q4 (=Q1× Qfv3).

The value of the correction coefficient Qfv3 has the same characteristics as those of the correction coefficient K-Qfv in FIG. 3, and when light fuel is used it becomes greater than 1. This is because it is necessary to increase the fuel injection amount as a control parameter compared to the case of standard fuel, so that the EGR amount does not shift to the low side when light fuel is used. Likewise, when heavy fuel is used, the fuel injection amount as a control parameter must be decreased compared to the case of standard fuel, so the value of Qfv3 becomes less than 1.

In these embodiments too, instead of the target injection amount, the fuel injection amount may be estimated from the fuel injection period detected by the control sleeve sensor 26, and this estimated value taken as Q1.

Figure 30:
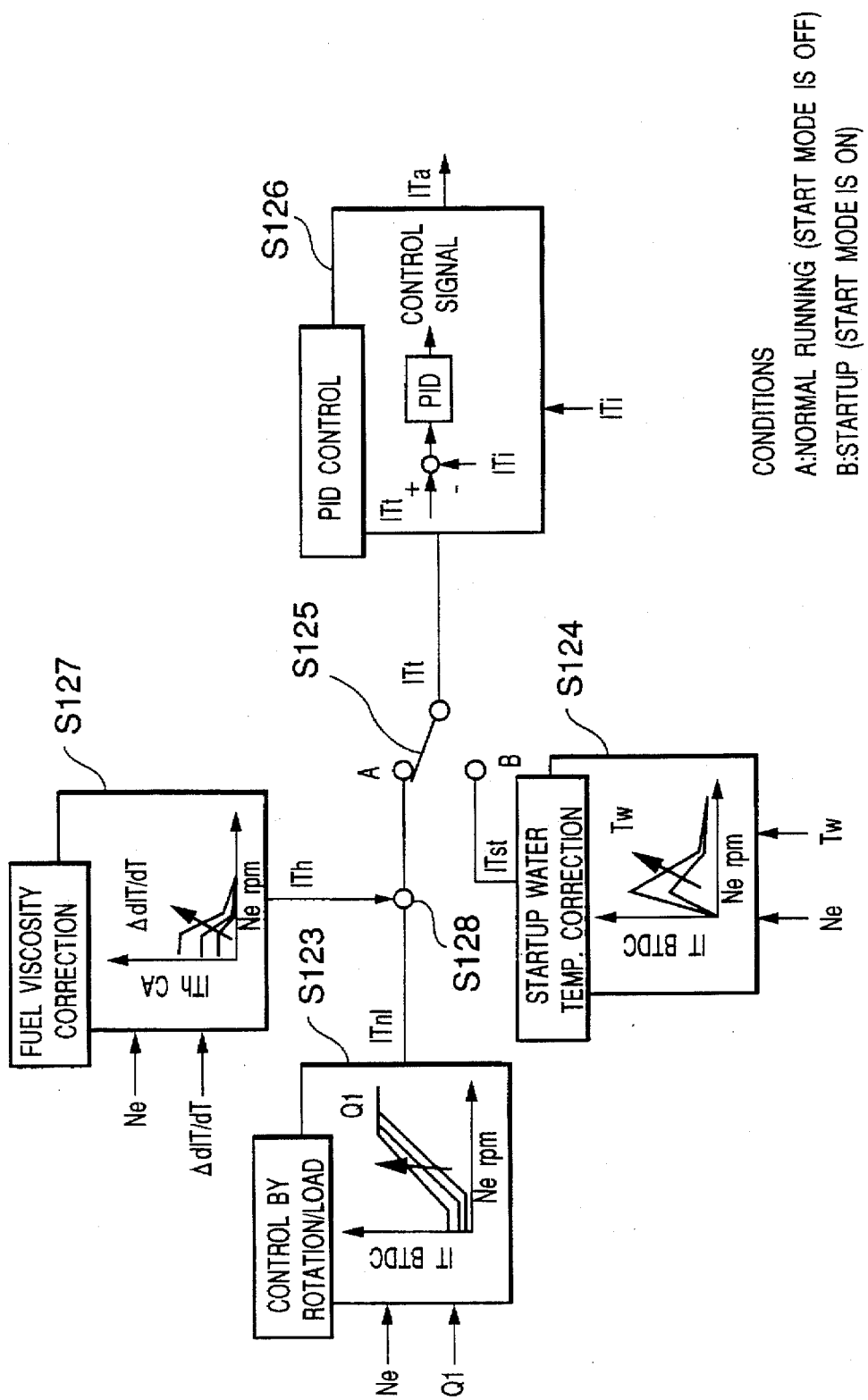
FIG. 30 is a block diagram describing a fuel injection timing control function of a controller according to an eleventh embodiment of this invention.

FIG. 30 shows an eleventh embodiment of this invention.

This figure corresponds to FIG. 10 of the fifth embodiment. According to this embodiment, functions S127, S128 have been added to those of the fifth embodiment.

When light fuel is used, the fuel viscosity sharply drops, so the leak amount in the plunger pressurized feed step or the return amount of the delivery valve at the end of the plunger pressurized feed step increases. As a result, although the injection nozzle should open in the first pressure wave, it may not do so, and in such a case the injection timing is considerably delayed. Herein, the intermittent or continuous occurrence of this condition is defined as an abnormal injection. During abnormal injection, for example, the injection timing is considerably delayed by a retardation angle of 8° CA-12° CA, so the torque generated by the engine sharply drops. Therefore, when such a delay of the injection timing intermittently occurs, it causes torque fluctuations.

This eleventh embodiment aims to suppress torque fluctuations due to injection when light fuel is used by applying an advance correction according to the fluctuation amount of the injection retardation period.

Specifically, in the function S127 of FIG. 30, a map previously stored in the control unit is looked up from a fluctuation amount ΔdIT/dT of the injection retardation period and the engine speed, and a fuel viscosity correction amount ITh of the injection timing is calculated. A fuel viscosity correction is then applied by adding this to the fuel injection timing ITnI for normal running conditions in the function S128.

This process will be described in further detail with reference to the flowchart of FIG. 31.

Figure 4:
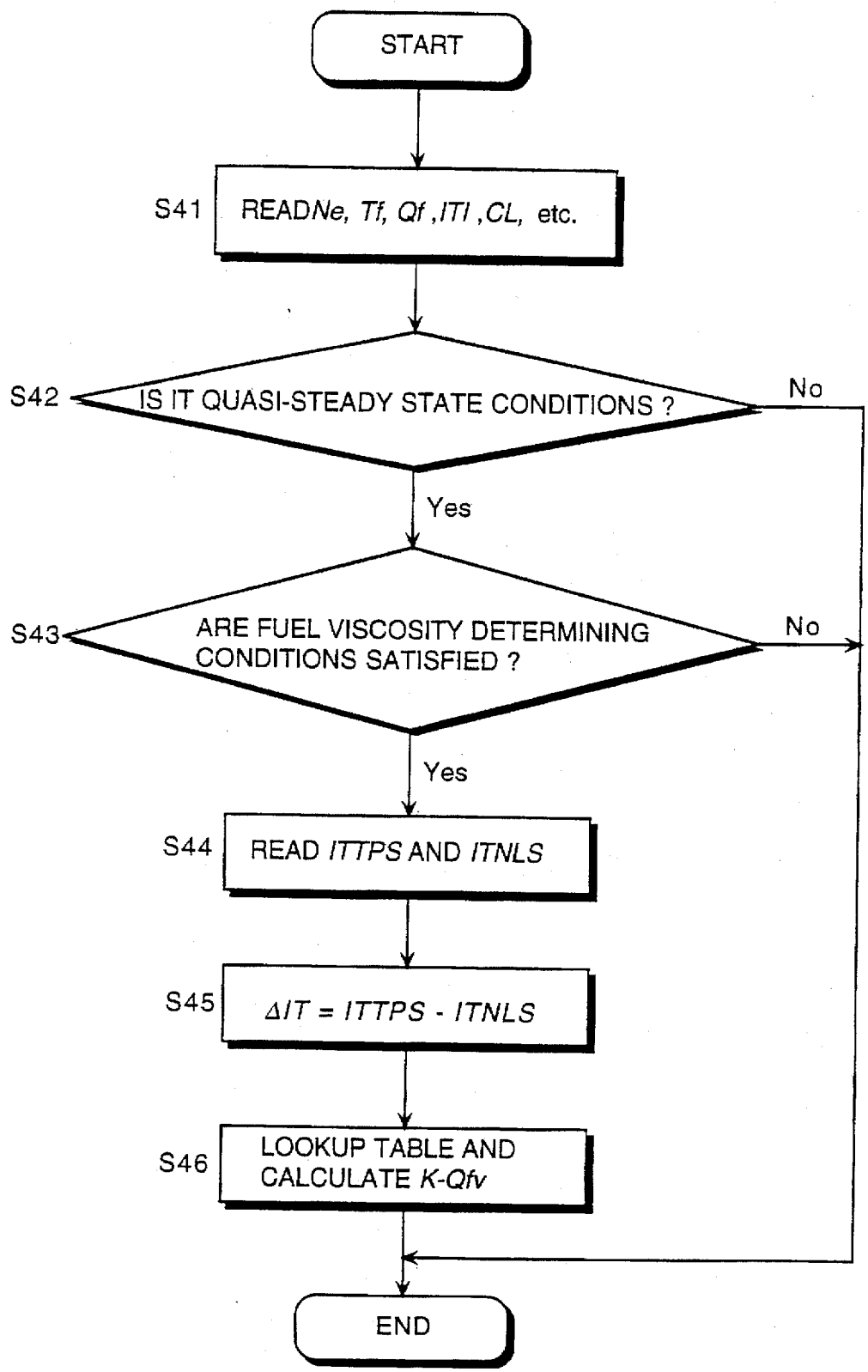
FIG. 4 is a flowchart describing a process for determining fuel viscosity and computing a fuel viscosity correction coefficient in the controller.

This process is executed at fixed time periods or engine rotation periods following the flowchart of FIG. 4 of the aforesaid first embodiment.

Figure 31:
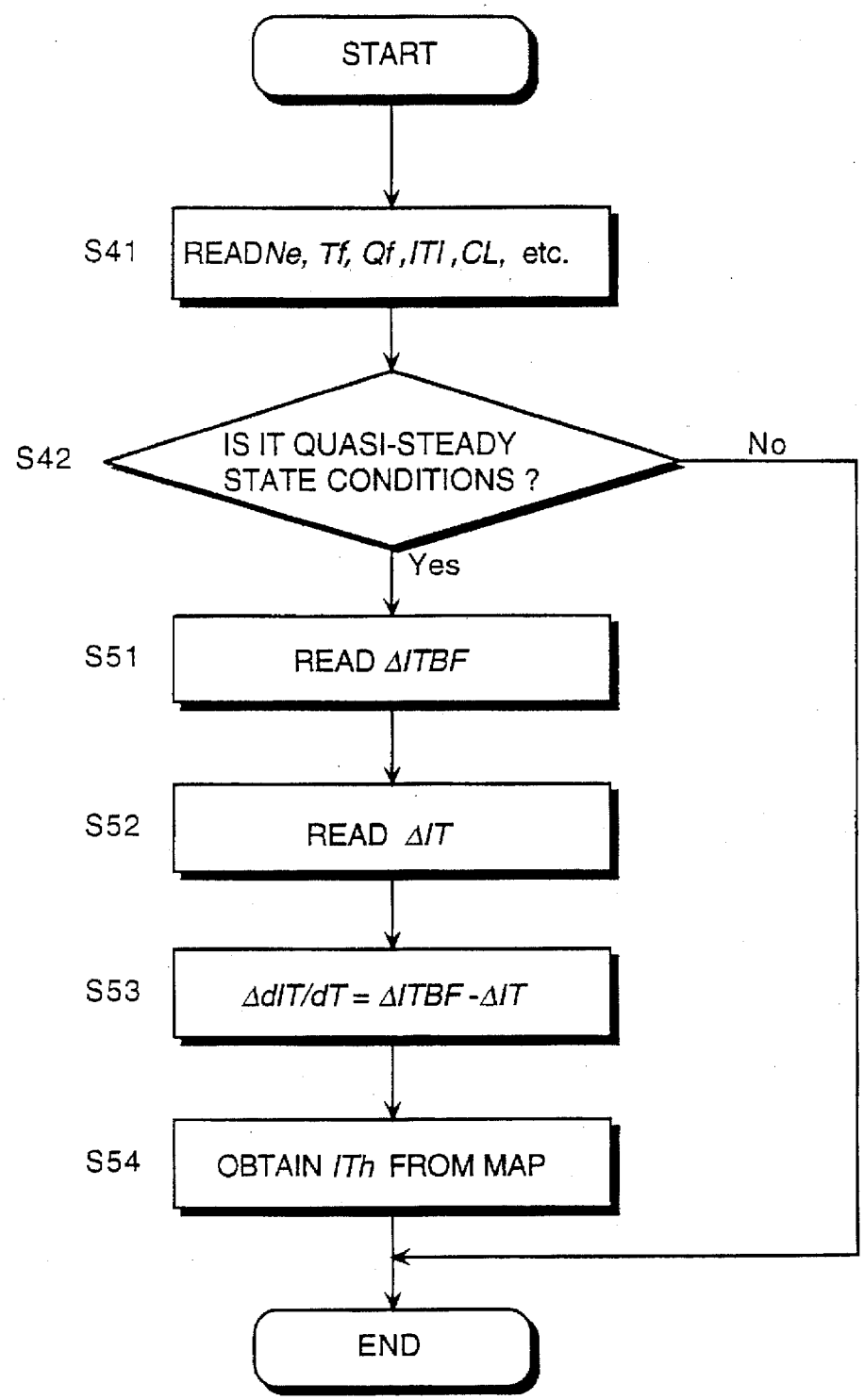
FIG. 31 is a flowchart describing a process of computing an injection timing correction amount according to the eleventh embodiment.

The steps S41 and S42 of FIG. 31 are the same as those of FIG. 4, and the routine proceeds to a step 551 and subsequent steps in the case of quasi-steady state running conditions.

In steps S51 and 552, an immediately preceding value ΔITBF of the injection retardation period and the present value ΔIT of the injection retardation period are read.

In a step S53, a fluctuation amount ΔdIT/dT of the injection retardation period is calculated by the following equation:

$$\Delta dIT/dT = \Delta ITBF - \Delta IT$$

Figure 32:
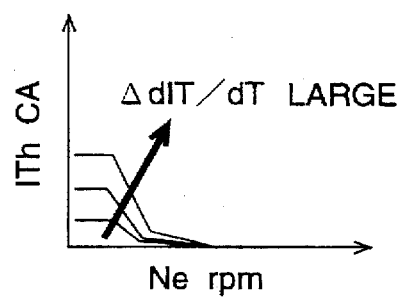
FIG. 32 is a block diagram showing characteristics of an injection timing correction ITh according to the eleventh embodiment.

An injection timing correction amount map having FIG. 32 as contents which is previously stored in the control unit is looked up from this injection retardation period fluctuation amount ΔdIT/dT and the engine speed, and the injection timing correction amount ITh is calculated.

In FIG. 32, the value of ITh increases in the low speed region because abnormal injection when light fuel is used tends to occur in the low speed region.

In this eleventh embodiment, abnormal injection is measured directly by the fluctuation of the injection retardation period, so it is possible to apply an advance correction for abnormal injection. Further, as the fuel viscosity is assumed to be that detected by the first embodiment, the injection retardation period fluctuation amount may be detected with high precision. This means that erroneous advance correction may be prevented in a region where advance correction is unnecessary. The injection timing control of the eleventh embodiment is performed based on a comparison of the target injection timing ITt and measured injection timing ITi as in the case of the fifth embodiment, however, this control may be based also on a comparison of a target timer piston position determined according to the speed and load and measured timer piston position [none]. In all of the aforesaid embodiments, the valve opening timing of the injection nozzle is detected by the nozzle lift sensor 28, but it may also be detected by measuring the expansion of an injection pipe connecting the injection nozzle and delivery valve using a strata gauge or by measuring the internal pressure in the injection pipe.

In all of the aforesaid embodiments, a distribution type fuel injection pump is used, however this invention may be applied also to series and cam shaft injection pumps, and to unit injectors. This invention may further be applied to an inner cam type injection pump which is a type of distribution pump.

The embodiments of this invention in which an exclusive property or privilege is claimed are defined as follows:

1. A fuel viscosity detector for use with a diesel engine, said engine comprising a fuel injection pump for supplying fuel under pressure by means of a plunger and a fuel injection nozzle for injecting said fuel into a cylinder of said engine, comprising:

means for detecting a fuel supply start timing of said plunger, means for detecting a fuel injection start timing of said fuel injection nozzle, means for calculating a difference between said fuel supply start timing and said fuel injection start timing as an rejection retardation period, and means for determining a fuel viscosity based on said injection retardation period.

2. A controller for use with a diesel engine, said engine comprising a fuel injection pump for supplying fuel under pressure by means of a plunger and a fuel injection nozzle for injecting said fuel into a cylinder of said engine, comprising:

an actuator for varying a fuel supply start timing of said plunger according to a fuel supply start signal, means for detecting a fuel supply start timing of said plunger, means for detecting fuel injection start timing of said fuel injection nozzle, means for calculating a difference between said fuel supply start timing and said fuel injection start timing as an injection retardation period, means for computing a fluctuation amount of said injection retardation period, and means for advance correcting said fuel supply start signal based on said fluctuation amount.

3. A controller for use with a diesel engine, said engine comprising a fuel injection pump for supplying fuel under pressure by means of a plunger, a fuel injection nozzle for injecting said fuel into a cylinder of said engine, and an accelerator for varying a fuel supply amount supplied by said plunger, comprising:

a fuel viscosity detector as defined in claim 1, an actuator for varying a pressurized fuel amount by said plunger according to a fuel supply amount signal, means for determining a target fuel supply amount according to an operation of said accelerator means for specifying a correspondence relation between said fuel supply amount signal and a supply amount of fuel of standard viscosity, means for correcting said fuel supply amount signal obtained from said target fuel supply amount and said correspondence relation based on a difference between a fuel viscosity detected by said fuel viscosity detector and said standard viscosity, and means for inputting a corrected fuel supply amount signal to said actuator.

4. A controller for use with a diesel engine, said engine comprising a fuel injection pump for supplying fuel under pressure by means of a plunger, a fuel injection nozzle for injecting said fuel into a cylinder of said engine, and an accelerator for varying a fuel supply amount supplied by said plunger, comprising:

a fuel viscosity detector as defined in claim 1, an actuator for varying a pressurized fuel amount by said plunger according to a fuel supply amount signal, means for determining a target fuel supply amount according to an operation of said accelerator, means for specifying a correspondence relation between said fuel supply amount signal and a supply amount of fuel of a standard viscosity, means for correcting said correspondence relation based on a difference between a fuel viscosity detected by said fuel viscosity detector and said standard viscosity, means for calculating said fuel supply amount signal based on said target fuel supply amount and a corrected correspondence relation corrected by said correcting means, and means for inputting said fuel supply amount signal to said actuator.

5. A controller for use with a diesel engine, said engine comprising a fuel injection pump for supplying fuel under pressure by means of a plunger, a fuel injection nozzle for injecting said fuel into a cylinder of said engine, and an accelerator for varying a fuel supply amount supplied by said plunger, comprising:

a fuel viscosity detector as defined in claim 1, an actuator for varying a pressurized fuel amount by said plunger according to a fuel supply amount signal, means for determining a target fuel supply amount according to an operation of said accelerator, means for specifying a correspondence relation between said fuel supply amount signal and a supply amount of fuel of a standard viscosity, means for specifying a correspondence relation between said fuel supply amount signal and a supply amount of fuel of a non-standard viscosity, means for selecting a correspondence relation from said correspondence relations based on a difference between a fuel viscosity detected by said fuel viscosity detector and said standard viscosity, and means for inputting a supply amount signal obtained from said target fuel supply amount and said selected correspondence relation to said actuator.

6. A controller for use with a diesel engine, said engine comprising a fuel injection pump for supplying fuel under pressure by means of a plunger, a fuel injection nozzle for injecting said fuel into a cylinder of said engine, and an accelerator for varying a fuel supply amount supplied by said plunger, comprising:

a fuel viscosity detector as defined in claim 1, an actuator for varying a fuel supply start timing of said plunger according to a fuel supply start signal, means for determining a target fuel supply amount according to an operation of said accelerator, means for correcting said target fuel supply amount based on a fuel viscosity detected by said fuel viscosity detector, means for detecting a rotation speed of said engine, and means for computing a target fuel supply start timing based on said corrected target fuel supply amount and said rotation speed, and means for inputting a fuel supply start signal corresponding to said target fuel supply timing to said actuator.

7. A controller for use with a diesel engine, said engine comprising a fuel injection pump for supplying fuel under pressure by means of a plunger, a fuel injection nozzle for injecting said fuel into a cylinder of said engine, and an accelerator for varying a fuel supply amount supplied by said plunger, comprising:

a fuel viscosity detector as defined in claim 1, an actuator for varying a fuel supply start timing of said plunger according to a fuel supply start signal, means for detecting a fuel supply period by said plunger, means for correcting a fuel supply amount estimated from said fuel supply period based on a fuel viscosity detected by said fuel viscosity detector, means for detecting a rotation speed of said engine, means for computing a target fuel supply start timing based on said corrected fuel supply amount and said rotation speed, and means for inputting a fuel supply start signal corresponding to said target fuel supply start timing to said actuator.

8. A controller used for use with a diesel engine, said engine comprising a fuel injection pump for supplying fuel under pressure by means of a plunger, a fuel injection nozzle for injecting said fuel into a cylinder of said engine, an accelerator for varying a fuel supply amount supplied by said plunger, and an EGR valve for recirculating a part of exhaust of said engine, comprising:

a fuel viscosity detector as defined in claim 1, an actuator for varying a flowrate of said EGR valve according to a flowrate signal, means for determining a target fuel supply amount according to an operation of said accelerator, means for correcting said target fuel supply amount based on a fuel viscosity detected by said fuel viscosity detector, means for detecting a rotation speed of said engine, means for computing a target flowrate of said EGR valve based on said corrected target fuel supply amount and said rotation speed, and means for inputting a flowrate signal corresponding to said target flowrate to said actuator.

9. A controller for use with a diesel engine, said engine comprising a fuel injection pump for supplying fuel under pressure by means of a plunger, a fuel injection nozzle for injecting said fuel into a cylinder of said engine, an accelerator for varying a fuel supply amount supplied by said plunger, and an EGR valve for recirculating a part of exhaust of said engine, comprising:

a fuel viscosity detector as defined in claim 1, an actuator for varying a flowrate of said EGR valve according to a flowrate signal, means for detecting a fuel supply period by said plunger, means for correcting a fuel supply amount estimated from said fuel supply period, based on a fuel viscosity detected by said fuel viscosity detector, means for detecting a rotation speed of said engine, means for computing a target flowrate of said EGR valve based on said corrected target fuel supply amount and said rotation speed, and means for inputting a flowrate signal corresponding to said target flowrate to said actuator.

10. A controller for use with a diesel engine, said engine comprising a fuel injection pump for supplying fuel under pressure by means of a plunger, a fuel injection nozzle for injecting said fuel into a cylinder of said engine, an accelerator for varying a fuel supply amount supplied by said plunger, and an EGR valve for recirculating a part of exhaust of said engine, comprising:

a fuel viscosity detector as defined in claim 1, an actuator for varying a flowrate of said EGR valve according to a flowrate signal, means for determining a target fuel supply amount according to an operation of said accelerator, means for correcting said target fuel amount based on a fuel viscosity detected by said fuel viscosity detector, means for detecting a rotation of said engine, means for detecting an intake air volume of said engine, means for detecting a temperature of said intake air, means for computing an air-fuel ratio inside said cylinder from said intake air volume, said intake air temperature and said corrected target fuel supply amount, means for computing a target flowrate of said EGR valve based on said corrected target fuel supply amount, said rotation speed and said air-fuel ratio, and means for inputting a flowrate signal corresponding to said target flowrate to said actuator.

11. A controller for use with a diesel engine, said engine comprising a fuel injection pump for supplying fuel under pressure by means of a plunger, a fuel injection nozzle for injecting said fuel into a cylinder of said engine, an accelerator for varying a fuel supply amount supplied by said plunger, and an EGR valve for recirculating a part of exhaust of said engine, comprising:

a fuel viscosity detector as defined in claim 1, an actuator for varying a flowrate of said EGR valve according to a flowrate signal, means for detecting a fuel supply period by said plunger, means for correcting said target fuel supply amount based on a fuel viscosity detected by said fuel viscosity detector, means for detecting a rotation speed of said engine, means for detecting an intake air volume of said engine, means for detecting a temperature of said intake air, means for computing an air-fuel ratio inside said cylinder from said intake air volume, said intake air temperature and said corrected target fuel supply amount, means for computing a target flowrate of said EGR valve based on said corrected target fuel supply amount, said engine speed and said air-fuel ratio, and means for inputting a flowrate signal corresponding to said target flowrate to said actuator.

12. A controller for use with a diesel engine, said engine comprising a fuel injection pump for supplying fuel under pressure by means of a plunger, a fuel injection nozzle for injecting said fuel into a cylinder of said engine, and an accelerator for varying a pressurized fuel amount supplied by said plunger, comprising:

a fuel viscosity detector as defined in claim 1, means for setting a proportional constant according to a detected fuel viscosity, means for detecting an engine idle rotation speed, means for computing a proportional part of a fuel supply amount correction based on a difference between an idle rotation speed and a predetermined target idle rotation speed, and said proportional constant, means for computing a correction amount of a fuel supply amount when said engine is in an idle running state using said proportional part, and means for varying said fuel supply amount supplied by said plunger when said engine is in said idle running state according to said correction amount.

* * * * *